US012582580B2

(12) United States Patent
Sacchetti

(10) Patent No.: US 12,582,580 B2
(45) Date of Patent: Mar. 24, 2026

(54) SET DETECTION AND FLOW MONITORING SYSTEM

(71) Applicant: AMSINO MEDICAL INC., Shanghai (CN)

(72) Inventor: Peter J. Sacchetti, North Falmouth, MA (US)

(73) Assignee: AMSINO MEDICAL INC., Shanghai (CN)

( * ) Notice: Subject to any disclaimer, the term of this patent is extended or adjusted under 35 U.S.C. 154(b) by 0 days.

(21) Appl. No.: 18/673,147

(22) Filed: May 23, 2024

(65) Prior Publication Data

US 2024/0398671 A1 Dec. 5, 2024

Related U.S. Application Data

(60) Provisional application No. 63/505,038, filed on May 30, 2023.

(51) Int. Cl.
*A61J 15/00* (2006.01)
*F04B 43/00* (2006.01)

(52) U.S. Cl.
CPC ......... *A61J 15/0076* (2015.05); *A61J 15/008* (2015.05); *F04B 43/0081* (2013.01); *A61J 2200/70* (2013.01)

(58) Field of Classification Search
CPC .. A61J 15/0076; A61J 15/008; A61J 2200/70; F04B 43/0081
See application file for complete search history.

(56) References Cited

U.S. PATENT DOCUMENTS 3,411,534 A 11/1968 Rose
4,061,142 A 12/1977 Tuttle
(Continued)

FOREIGN PATENT DOCUMENTS

CN 110327218 A 10/2019
DE 10256777 A1 * 7/2004 .......... A61M 1/0066
(Continued)

OTHER PUBLICATIONS

"International Search Report and Written Opinion received for PCT Patent Application No. PCT/US2022/075110, mailed on Jan. 17, 2023", 11 pages.

(Continued)

*Primary Examiner* — James D Ponton
*Assistant Examiner* — John A Doubrava
(74) *Attorney, Agent, or Firm* — Getech Law LLC; Jun Ye

(57) ABSTRACT

Intelligent systems are disclosed for monitoring of enteral feeding pumps. The systems include a structure with a pivot mechanism, a fluid pump, a force-responsive electrical component, and an optional computing device. The pivot mechanism moves in response to force. The fluid pump moves feeding fluid, and the force-responsive electrical component changes electrical properties in response to force and alters resistance in the presence of an obstruction. The optional computing device can transmit an alert to a healthcare provider, for example, via smartphone. The force-responsive electrical component provides an electrical response in proportion to tension on a conduit and decreases resistance when there is an obstruction in the conduit. The systems sends an alert signal when the electrical response indicates an obstruction in the conduit.

12 Claims, 11 Drawing Sheets

(56) References Cited

U.S. PATENT DOCUMENTS

| | | | | | |
|---|---|---|---|---|---|
| 4,723,948 | A | | 2/1988 | Clark et al. | |
| 4,783,045 | A | | 11/1988 | Tartaglino | |
| 4,878,646 | A | | 11/1989 | Edelman et al. | |
| 5,007,803 | A | | 4/1991 | Divito et al. | |
| 5,026,020 | A | | 6/1991 | Betush | |
| D318,718 | S | | 7/1991 | Blatt | |
| 5,201,711 | A | | 4/1993 | Pasqualucci et al. | |
| 5,385,372 | A | | 1/1995 | Utterberg | |
| 5,429,485 | A | | 7/1995 | Dodge | |
| 5,514,102 | A | * | 5/1996 | Winterer | G16H 20/17 604/118 |
| 6,488,660 | B1 | | 12/2002 | Futterknecht | |
| 6,632,073 | B2 | | 10/2003 | Newcomer | |
| 6,749,090 | B2 | | 6/2004 | Bailey | |
| D523,553 | S | | 6/2006 | Beck et al. | |
| D578,209 | S | | 10/2008 | Schurg et al. | |
| 7,722,573 | B2 | | 5/2010 | Harr et al. | |
| 7,896,310 | B2 | | 3/2011 | Johansson et al. | |
| 8,152,780 | B2 | | 4/2012 | Evans et al. | |
| 8,277,196 | B2 | | 10/2012 | Lewis et al. | |
| D672,455 | S | | 12/2012 | Beck | |
| 8,387,943 | B1 | | 3/2013 | Mattheis | |
| 8,425,470 | B2 | | 4/2013 | Beck et al. | |
| 8,807,517 | B2 | | 8/2014 | Townsend | |
| 8,876,787 | B2 | | 11/2014 | Beck et al. | |
| D745,963 | S | | 12/2015 | Mollstam et al. | |
| 9,707,068 | B2 | | 7/2017 | Drager et al. | |
| 9,976,545 | B2 | | 5/2018 | Glauber et al. | |
| 10,174,849 | B2 | | 1/2019 | Javaheri | |
| 10,376,447 | B2 | | 8/2019 | Besser et al. | |
| 11,213,460 | B2 | | 1/2022 | O'Keefe et al. | |
| 2003/0183647 | A1 | * | 10/2003 | Ven Huizen | A01C 7/0443 221/211 |
| 2003/0212381 | A1 | | 11/2003 | Whitehead, III | |
| 2004/0097903 | A1 | | 5/2004 | Raulerson | |
| 2005/0267418 | A1 | | 12/2005 | Fournie et al. | |
| 2006/0167415 | A1 | | 7/2006 | Nemoto | |
| 2009/0270842 | A1 | | 10/2009 | Blocher et al. | |
| 2010/0211022 | A1 | | 8/2010 | Harr et al. | |
| 2013/0277443 | A1 | | 10/2013 | Croll et al. | |
| 2014/0180084 | A1 | * | 6/2014 | Vilks | A61M 25/0009 600/431 |
| 2014/0249412 | A1 | | 9/2014 | Yamamoto | |
| 2015/0240802 | A1 | | 8/2015 | Guthrie et al. | |
| 2018/0216539 | A1 | | 8/2018 | Widener et al. | |
| 2018/0245699 | A1 | | 8/2018 | Lee | |
| 2018/0360695 | A1 | | 12/2018 | Jedwab et al. | |
| 2019/0388618 | A1 | | 12/2019 | Biermann et al. | |
| 2020/0000682 | A1 | | 1/2020 | Hoffstetter | |
| 2020/0085696 | A1 | | 3/2020 | Harr | |
| 2020/0096120 | A1 | | 3/2020 | Bargh | |
| 2020/0179671 | A1 | | 6/2020 | Geppert et al. | |
| 2020/0393336 | A1 | | 12/2020 | Jones et al. | |
| 2020/0405529 | A1 | * | 12/2020 | Taylor | G08B 3/10 |
| 2021/0000694 | A1 | | 1/2021 | Bauer et al. | |
| 2021/0212903 | A1 | | 7/2021 | Okeefe et al. | |
| 2021/0298995 | A1 | | 9/2021 | Elia et al. | |
| 2023/0363981 | A1 | | 11/2023 | Sacchetti et al. | |

FOREIGN PATENT DOCUMENTS

| | | | |
|---|---|---|---|
| EP | 1604699 | B1 | 7/2014 |
| EP | 2108086 | B1 | 8/2018 |
| JP | 2008208879 | A | 9/2008 |
| WO | 2020048911 | A1 | 3/2020 |
| WO | 2021055804 | A1 | 3/2021 |

OTHER PUBLICATIONS

"International Search Report and Written Opinion received for PCT Patent Application No. PCT/US2023/067642, mailed on Feb. 26, 2024", 12 pages.

* cited by examiner

SET DETECTION AND FLOW MONITORING SYSTEM

CROSS-REFERENCE TO RELATED APPLICATIONS

This application claims the benefit of priority to United States Provisional Patent No.: 63/505,038, filed May 30, 2023, the entire disclosure of which is incorporated by reference as if fully set forth herein in its entirety.

FIELD OF THE INVENTION

Example embodiments of the present invention relate to enteral feeding pump systems, and more particularly, to enteral feeding pump monitoring, control, and safety systems for providing backup and alarm features.

BACKGROUND OF THE INVENTION

Enteral feeding, also known as tube feeding, involves delivering nutrition directly into the gastrointestinal tract through a tube, bypassing the mouth and esophagus. It is commonly used when a person is unable to consume food orally or has difficulty swallowing. Tube feeding can be done through various types of tubes, such as nasogastric, gastrostomy, or jejunostomy tubes. The enteral or tube method ensures that the individual receives the necessary nutrients and hydration to maintain their health and well-being.

Typically, a dietitian is responsible for monitoring a patient's tube feeding. Dietitians have specialized knowledge in nutrition and are trained to create and manage personalized meal plans for patients. As tube feeding requires careful monitoring of the patient's nutritional needs and progress, a dietitian is the most suitable healthcare professional for this task.

In many instances, the medical diameter of a feeding tube is measured in a "French scale" or in "French units". French units are commonly used in medical settings to measure the size of medical equipment, including feeding tubes. The French scale is a unit of measurement that can represent the outer diameter of a tube. It is often used to determine the appropriate size of a feeding tube for a patient. The French scale, French gauge or Charrière system is commonly used to measure the size of a tube. It is most often abbreviated as Fr, but can often be seen abbreviated as Fg, FR or F. It may also be abbreviated as CH or Ch (for Charrière, its inventor). However, simply gauge, G or GA generally refers to Birmingham gauge[1]. The Charrière is measured by the "outer" diameter, and is defined as 1 Fr=1/3 mm, and thus 1 mm=3 Fr; therefore the diameter of a round catheter in millimeters can be determined by dividing the French size by 3.[2] Thus, the French units roughly correspond to the outer circumference of the catheter.

For example, if the French size is 9, the diameter is 9/3=3.0 mm. In general, the French unit is fully redundant with the metric system but can introduce a potential for rounding errors. This metrication problem is further complicated by the mixed use of metric and imperial units in medical professions using catheters. These units are in general, used for speed of reference because enteral feeding pump systems are used to supply fluid nutrition to patients who are unable to eat. The pumping system typically includes a pump and disposable tubing sets (see, e.g., FIG. 1). An enteral feeding pump may be designed to pump only liquid nutrient formula or nutrient formula and water, separately.

While a dietitian can provide a customized nutrition plan for a patient with enteral feeding, monitoring the patient's tube feeding requires almost constant diligence and alertness. What is urgently needed are better automated systems for to enteral feeding pump control and safety systems for providing backup and alarm features.

BRIEF SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Enteral feeding pumps are commonly used in healthcare settings to deliver nutrition directly to a patient's stomach or small intestine. These pumps typically use elastomeric tubing to transport the liquid nutrients. However, the operation of these pumps can be affected by various factors. For instance, clogs in the tubing can disrupt the flow of nutrients, potentially leading to undernourishment or other health complications for the patient. Moreover, the tension on the tubing can also impact the pump's performance. Therefore, there is a need for a system that can effectively monitor and respond to these issues to ensure the smooth and efficient operation of enteral feeding pumps. Furthermore, human monitoring and diligence to constantly monitor enteral feeding pumps must become a thing of the past, and the technology herein can intelligently monitor flow and conditions of an enteral feeding pump.

Some features of the technology disclosed herein can be briefly summarized by the following list of features:

Feature 1: A system for detecting a normal fluid flow through an enteral feeding pump and for detecting an abnormal fluid flow or a lack of flow through the pump, the system comprising: a motor mounted to a pivotable motor mounting plate, the motor including a motor shaft that extends through an external housing and that pivots, along with the motor mounting plate, along a pivot axis in a response to a force applied to a central hub supporting a rotor outside of the external housing from a peristaltic pumping of an elastomeric tubing section wrapped on the rotor; wherein the motor mounting plate is freely pivotable along the pivot axis, and the motor mounting plate is operative to compress a force sensor, operative to detect a normal flow or an abnormal flow, between an internal side of the external housing plate and the motor mounting plate in the response to the force from the peristaltic pumping; wherein the rotor functions to accept the elastomeric tubing section, and rollers on the rotor function to pump a fluid through the elastomeric tubing section when the motor turns the motor shaft in the peristaltic pumping of the elastomeric tubing; and wherein when the elastomeric tubing section is installed on the rotor, and the motor shaft is turning, and a normal fluid flow is established through the pump, a pressure on the force sensor is in a normal peristaltic state; wherein when a clog or a malfunction occurs in the elastomeric tubing section, an altered pressure on the force sensor is operative to indicate an abnormal or a clogged state in the elastomeric tubing section.

Feature 2: The system of feature 1, wherein the force sensor comprises a force sensitive resistor.

Feature 3: The system of feature 1, wherein the system includes a gap between the motor mounting plate and the internal side of the external housing plate when there is not an elastomeric tubing section on the roller.

Feature 4: The system of feature 1, wherein the motor shaft is disposed at an acute angle in relation to a plane defined by the external housing when there is not an elastomeric tubing section on the roller.

Feature 5: The system of feature 1, wherein the motor shaft is disposed about orthogonal to the external house when there is an elastomeric tubing section on the roller.

Feature 6: The system of feature 1, wherein when an elastomeric tubing section is affixed around the rotor, an elastomeric tension on the elastomeric tubing section is operative to cause a tilt in the pivotable motor mounting plate, and the tilt causes a pressure between the motor mounting plate and the internal side of the external housing plate; said pressure causing a change in a state of the force sensor.

Feature 7: The system of feature 1, further comprising one or more electrical connections between the force sensor and a processor; said processor operative to indicate an alarm state when the force sensor detects an abnormal flow or a lack of flow.

Feature 8: The system of feature 1, further comprising one or more electrical connections between the force sensor and a processor, and a wireless transmission device operative to transmit an alarm signal when the force sensor detects an abnormal flow or a lack of flow.

Feature 9: The system of feature 1, wherein the force sensor is operative to perform a shut off of the motor when the force sensor detects an abnormal flow or a lack of flow.

Feature 10: The system of feature 1, wherein the pivotable motor mount includes one or more springs or spring mechanisms operative to push the pivotable motor mount against the internal side of the external housing plate so that the pivotable motor mount is not parallel to the external housing plate when no elastomeric tubing section is on the rotor.

Feature 11: The system of feature 1, further comprising a computer with software and memory operative to store a normal electrical output for the sensor and 1) to detect an abnormal electrical output from the sensor and to 2) transmit an alarm to a healthcare provider when the abnormal electrical output is detected.

Feature 12: A method for monitoring a fluid flow from an enteric feeding pump, the method comprising the steps of: (1) obtaining a system comprising: a motor mounted to a pivotable motor mounting plate, the motor including a motor shaft that extends through an external housing and that pivots, along with the motor mounting plate, along a pivot axis in a response to a force applied to a central hub supporting a rotor outside of the external housing from a peristaltic pumping of an elastomeric tubing section wrapped on the rotor; wherein the motor mounting plate is freely pivotable along the pivot axis, and the motor mounting plate is operative to compress a force sensitive resistor, operative to detect a normal flow or an abnormal flow, between an internal side of the external housing plate and the motor mounting plate in the response to the force from the peristaltic pumping; wherein the rotor functions to accept the elastomeric tubing section, and rollers on the rotor function to pump a fluid through the elastomeric tubing section when the motor turns the motor shaft in the peristaltic pumping of the elastomeric tubing; wherein when the elastomeric tubing section is installed on the rotor, and the motor shaft is turning, and a normal fluid flow is established through the pump, a pressure on the force sensitive resistor is in a normal peristaltic state; wherein when a clog or a malfunction occurs in the elastomeric tubing section, an altered pressure on the force sensitive resistor is operative to indicate an abnormal or a clogged state in the elastomeric tubing section; (2) establishing a normal fluid flow through the enteric feeding pump; and (3) waiting for a sufficient period of time for the force sensitive resistor to indicate the abnormal or the clogged state in the elastomeric tubing section.

Feature 13: The method of feature 12, wherein the system further comprises a computer with software and memory operative to store a normal electrical output for the sensor, operative to detect an abnormal electrical output from the sensor, and operative to transmit an alarm to a healthcare provider when the abnormal electrical output is detected.

Feature 14: The method of feature 12, wherein the method further comprises waiting for a sufficient period of time for a transmitted alarm to be received on a receiver comprising a radio receiver, a smartphone, an internet receiver, or a wearable device. 15. The method of feature 12, wherein when an elastomeric tubing section is affixed around the rotor, an elastomeric tension on the elastomeric tubing section is operative to cause a tilt in the pivotable motor mounting plate, and the tilt causes a pressure between the motor mounting plate and the internal side of the external housing plate; said pressure causing a change in a state of the force sensitive resistor.

Feature 16: The method of feature 12, wherein the system is further comprising one or more electrical connections between the force sensing resistor and a processor; said processor operative to indicate an alarm state when the force sensing resistor detects an abnormal flow or a lack of flow.

Feature 17: The method of feature 12, wherein the method is a continuous method but wherein the force sensor is operative to perform a shut off of the motor when the force sensor detects an abnormal flow or a lack of flow.

Feature 18: The method of feature 12, wherein the pivotable motor mount includes one or more springs or spring mechanisms operative to push the pivotable motor mount against the internal side of the external housing plate so that the pivotable motor mount is not parallel to the external housing plate when no elastomeric tubing section is on the rotor.

Feature 19: A kit for upgrading an enteric feeding pump so that the enteric feeding pump can detect a normal fluid flow through the enteral feeding pump and can detect an abnormal fluid flow or a lack of flow through the pump after the upgrade, the kit comprising: A) a pivotable motor mounting plate operative to mount a motor upon the plate, the motor including a motor shaft that extends through an external housing and that pivots, along with the motor mounting plate, along a pivot axis in a response to a force applied to a central hub supporting a rotor outside of the external housing from a peristaltic pumping of an elastomeric tubing section wrapped on the rotor; a force sensor, wherein the motor mounting plate is freely pivotable along the pivot axis, and the motor mounting plate is operative to compress the force sensor, operative to detect a normal flow or an abnormal flow, between an internal side of the external housing plate and the motor mounting plate in the response to the force from the peristaltic pumping; wherein the rotor functions to accept the elastomeric tubing section, and rollers on the rotor function to pump a fluid through the elastomeric tubing section when the motor turns the motor shaft in the peristaltic pumping of the elastomeric tubing;

wherein when the elastomeric tubing section is installed on the rotor, and the motor shaft is turning, and a normal fluid flow is established through the pump, a pressure on the force sensor is in a normal peristaltic state; wherein when a clog or a malfunction occurs in the elastomeric tubing section, an altered pressure on the force sensor is operative to indicate an abnormal or a clogged state in the elastomeric tubing section; and B) instructions for installing one or more parts in A) above and instructions for use.

Feature 20: The kit of feature 19, wherein the force sensor comprises a force sensitive resistor, and wherein the kit is configured to electrically connect the force sensitive resistor to a computer with software and WiFi.

In some embodiments, the force sensor can be any transducer operative to cause a change in an electrical signal when a change in a mechanical pressure is caused upon the transducer. According to some aspects, the force sensor can include a laser, a light, an accelerometer, or a combination thereof.

In accordance with embodiments, a system is provided that includes a structure with a pivot mechanism, a fluid pump, a force-responsive electrical component, and a computing device. The pivot mechanism moves in response to force, the fluid pump moves fluid, and the force-responsive electrical component changes electrical properties in response to force and alters resistance in the presence of an obstruction. The computing device transmits an alert to a recipient when the electrical response from the force-responsive electrical component indicates an obstruction in the conduit.

In other embodiments, a method is provided that involves moving a structure with a pivot mechanism in response to force, moving fluid with a fluid pump, changing electrical properties of a force-responsive electrical component in response to force, and altering resistance of the force-responsive electrical component in the presence of an obstruction. An alert is transmitted from a computing device to a recipient when the electrical response from the force-responsive electrical component indicates an obstruction in the conduit.

As will be discussed in more detail below, the technology disclosed herein solves many of the larger problems in enteral feeding pump systems and can even provide alarms through smartphone technologies.

It is important to note that any of the embodiments discussed herein can be combined with any other embodiments or aspects disclosed herein. The entire disclosure does not limit the spirit and consciousness of the invention.

Other implementations are also described and recited herein. These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Solely for the purpose of illustration, certain embodiments of the present invention are explained using examples in the drawings described below. It should be understood, however, that the invention is not limited to the precise arrangements, dimensions, and configurations shown. In the figures.

Figure 1:
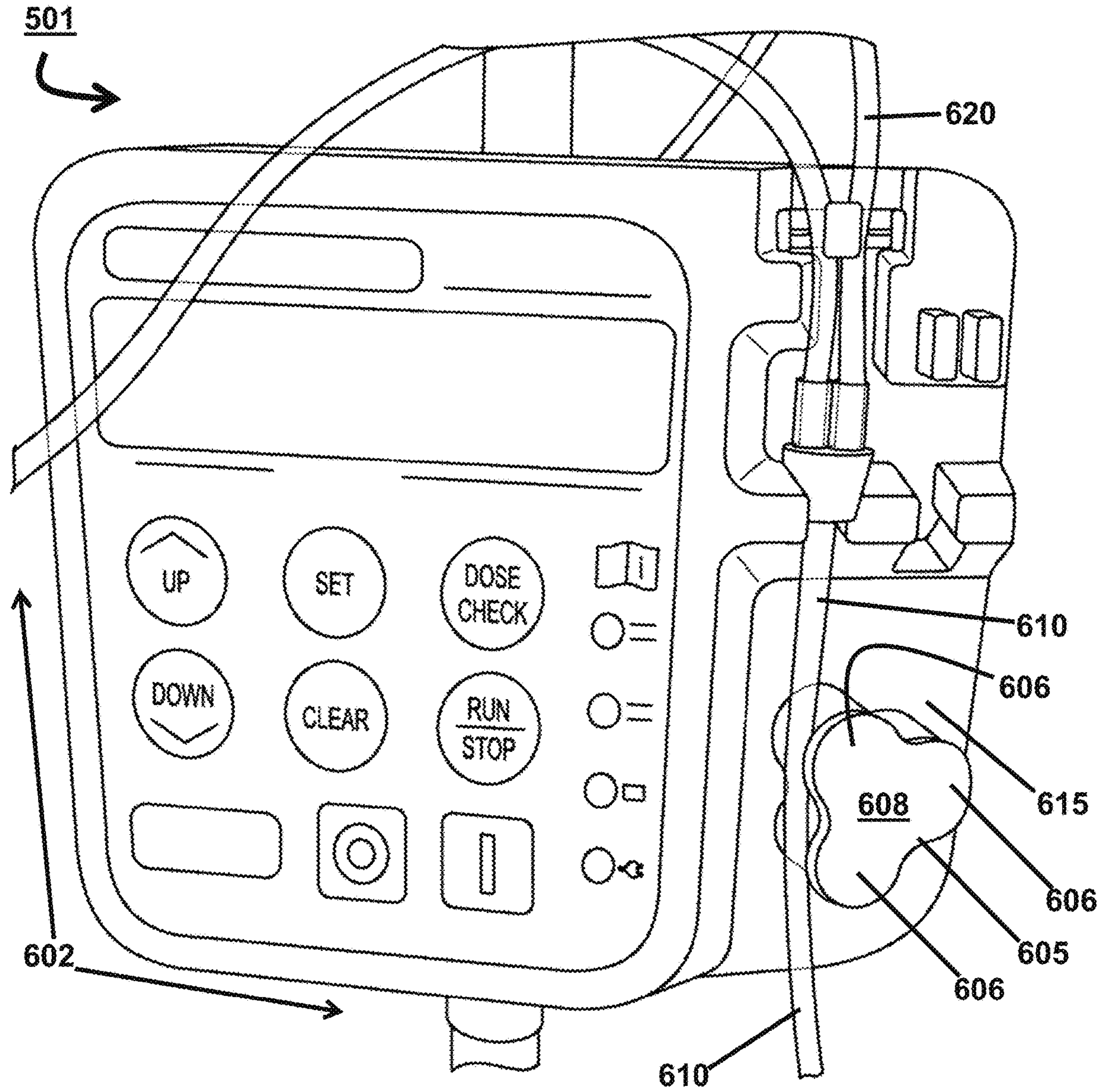
FIG. 1 shows a front view of an exemplary control unit of an exemplary enteral feeding pump system 501.

It should be understood that while different numbers/numbering are/is sometimes used in some of the figures above to describe different embodiments and different aspects of the technology, any number from any figure can be inter-combined with a numbered aspect from any other figures. Any trademarks, images, likenesses, words, and depictions in the drawings and the disclosure are plainly in fair use and are provided solely for the purposes of illustration of the invention in view of an urgent need to treat subjects in need of enteral feeding as further discussed in detail below.

DETAILED DESCRIPTION OF THE INVENTION

The subject innovation is now described in some instances, when necessary, with reference to the drawings. In the following description, for purposes of explanation, numerous specific details are set forth in order to provide a thorough understanding of the present invention. It may be evident, however, that the present invention may be practiced without these specific details. In other instances, well-known structures, methods, and devices are shown in block diagram form or with illustrations in order to facilitate describing the present invention. It is to be appreciated that certain aspects, modes, embodiments, variations and features of the invention are described below in various levels of detail in order to provide a substantial understanding of the present invention.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs. If there is an apparent discrepancy between the usage of a term in the art and its definition provided herein, the definition provided within the specification shall prevail. In general, typical chemical terminology is found in the International Union of Pure and Applied Chemistry GoldBook[3]. This disclosure is purposefully presented in commonly understood words, known to a person of skill in the art, but Merriam-Webster's Online Dictionary is used, when appropriate, for terms not specifically demonstrated herein or not known in the art[4].

As used in this specification and the appended claims, the singular forms "a," "an" and "the" include plural referents unless the content clearly dictates otherwise. For example, reference to "a cell" includes a combination of two or more cells, and the like.

As used herein, the term "approximately" or "about" in reference to a value or parameter are generally taken to include numbers that fall within a range of 5%, 10%, 15%, or 20% in either direction (greater than or less than) of the number unless otherwise stated or otherwise evident from the context (except where such number would be less than 0% or exceed 100% of a possible value). As used herein, reference to "approximately" or "about" a value or parameter includes (and describes) embodiments that are directed to that value or parameter. For example, description referring to "about X" includes description of "X".

As used herein, the term "or" means "and/or." The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, the term "comprising" means that other elements can also be present in addition to the defined elements presented. The use of "comprising" indicates inclusion rather than limitation. The term "including" can be interchanged with "comprising".

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of additional elements that do not materially affect the basic and novel or functional characteristic(s) of that embodiment of the invention. The term "consisting essentially of" can also be exemplified by plain language provided in the claims.

The term "statistically significant" or "significantly" refers to statistical significance and generally means a two-standard deviation (2SD) or greater difference.

As used herein, the term "subject" refers to a mammal, including but not limited to a dog, cat, horse, cow, pig, sheep, goat, rodent, or primate. Subjects can be house pets (e.g., dogs, cats), agricultural stock animals (e.g., cows, horses, pigs, chickens, etc.), laboratory animals (e.g., mice, rats, rabbits, etc.), but are not so limited. Subjects particularly include human subjects in urgent treatment as described herein. The human subject may be a pediatric, adult, or a geriatric subject. The human subject may be of any sex.

The term "treating" includes prophylactic and/or therapeutic treatments. The term "prophylactic or therapeutic" treatment is art-recognized and includes administration to the host of one or more of the subject compositions and/or application of one or more therapies or surgeries. If this is done prior to clinical manifestation of the unwanted condition (e.g., disease or other unwanted state of the host animal) then the treatment is prophylactic (i.e., it protects the host against developing the unwanted condition), whereas if it is administered after manifestation of the unwanted condition, the treatment is therapeutic, (i.e., it is intended to diminish, ameliorate, or stabilize the existing unwanted condition or side effects thereof).

As used herein, the terms "treat," "treatment," "treating," or "amelioration" when used in reference to a disease, disorder, or medical condition, refer to therapeutic surgeries or treatments for a condition, wherein the object is to reverse, alleviate, ameliorate, inhibit, slow down or stop the progression or severity of a symptom or condition. The term "treating" includes reducing or alleviating at least one adverse effect or symptom of a condition. Treatment is generally "effective" if one or more symptoms or clinical markers are reduced. Alternatively, treatment is "effective" if the progression of a condition is reduced or halted. That is, "treatment" includes not just the improvement of symptoms or markers, but also a cessation or at least slowing of progress or worsening of symptoms that would be expected in the absence of treatment. Beneficial or desired clinical results include, but are not limited to, alleviation of one or more symptom(s), sign(s), diminishment of extent of the deficit, stabilized (i.e., not worsening) state of a symptom or condition, delay or slowing of onset of symptoms or indications, and an increased lifespan as compared to that expected in the absence of treatment.

The terms: "decrease", "reduced", "reduction", or "inhibit" are all used herein to mean a decrease by a statistically significant amount. In some embodiments, "reduce," "reduction" or "decrease" or "inhibit" typically means a decrease by at least 10% as compared to a reference level (e.g., the absence of a given treatment or agent) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. A decrease can be preferably down to a level accepted as within the range of normal for an individual without a given disorder.

The terms "increased", "increase", "enhance", or "activate" are all used herein to mean an increase by a statically significant amount. In some embodiments, the terms "increased", "increase", "enhance", or "activate" can mean an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, a "increase" is a statistically significant increase in such level.

As used herein, an agent or a therapeutic agent provided to a subject and suspected to be or involved in a treatment can be a small molecule less than 1000 MW or a large molecule not less than 1000 MW including biologics, oligonucleotides, peptides, oligosaccharides, and larger molecules. Any of the therapeutic agents disclosed herein can be used as or in combination with small molecules and/or large molecules as discussed herein.

A subject can be one who has been previously diagnosed with or identified as suffering from or having a condition in need of treatment (e.g., a bone fracture and/or a malalignment of a bone, a pain, weakness, numbness, tingling, a bone spur, arthritis, or a related disorder) or one or more complications related to such a condition, and optionally, but need not have already undergone treatment for a condition or the one or more complications related to the condition. Alternatively, a subject can also be one who has not been previously diagnosed as having a condition in need of treatment or one or more complications related to such a condition. For example, a subject can be one who exhibits one or more risk factors for a condition, or one or more complications related to a condition or a subject who does not exhibit risk factors. A "subject in need" of treatment for a particular condition can be a subject having that condition, diagnosed as having that condition, suspected as having, or at risk of developing that condition. In another example, the subject has been brought into a treatment situation entirely without the subject's knowledge and/or intent. For example, a subject can obviously be in need of treatment but not be responsive to a previous treatment, and as described herein the present methods and implants may save the subject's life.

In general, as used herein the term "healthcare provider" can be interchanged with "dietitian" because dietitians are commonly supervising operation of an enteral feeding pump.

As discussed above, unless otherwise defined herein, scientific and technical terms used in connection with the present application shall have the meanings that are commonly understood by those of ordinary skill in the art to which this disclosure belongs. It should be understood that this invention is not limited to the particular methodology, protocols, devices, implants, and reagents, etc., described herein and as such can vary. The terminology used herein is for the purpose of describing particular embodiments only and is not intended to limit the scope of the present invention, which is defined solely by the claims. Definitions of common terms in immunology and molecular biology can be found in The Merck Manual of Diagnosis and Therapy;[5] The Encyclopedia of Molecular Cell Biology and Molecular Medicine;[6] Molecular Biology and Biotechnology: a Comprehensive Desk Reference;[7] Immunology;[8] Janeway's Immunobiology;[9] Lewin's Genes XI;[10] Molecular Cloning: A Laboratory Manual.;[11] Basic Methods in Molecular Biology;[12] Laboratory Methods in Enzymology;[13] Current Protocols in Molecular Biology (CPMB)[14]; Current Protocols in Protein Science (CPPS);[15] and Current Protocols in Immunology (CPI)[16].

In the embodiments discussed and in any of the aspects, the disclosure described herein does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and also animals resulting from such processes.

Other terms are defined herein within the description of the various aspects of the invention. It is clearly contemplated herein that the technology can be used in surgeries in addition to a bone with a malalignment or a bone with a fracture, and the implants and techniques disclosed herein are not limited by the accurate discussion of applications in various surgeries.

Set Detection And Flow Monitoring System

Enteral feeding pumps are used to deliver liquid nutrition formula to patients who are unable to eat. Enteral feeding pumps typically utilize disposable tubing sets. As an overview, FIG. 1 shows a front view of a control unit 602 of an exemplary enteral feeding pump system 501. A disposable tubing set 620 is illustrated on the control unit 602. The tubing set includes an elastomeric tubing section 610 that enables peristaltic pumping when installed in tension against a rotor 605. The rotor used has rollers 606. The rollers 606 can cause a peristaltic pumping when rotating against the elastomeric tubing section 610. Usually, three or four rollers are mounted equidistant on flanges attached to a central hub 608. A motor (not visible) drives the central hub 608, which is attached to the motor. The motor is behind external housing plate 615 which is located on a horizontal pivot which is part of the pump enclosure. When the elastomeric tube under tension is engaged by a moving rotor, then tension is sufficient to pinch off the tubing and this pinched cross-section travels in the direction of rotor rotation. Pinched sections of leading and following rotors form a closed volume and thus the fluid within the volume is transferred around the rotor creating the pump flow. This can be referred to as peristaltic pumping.

Figure 2:
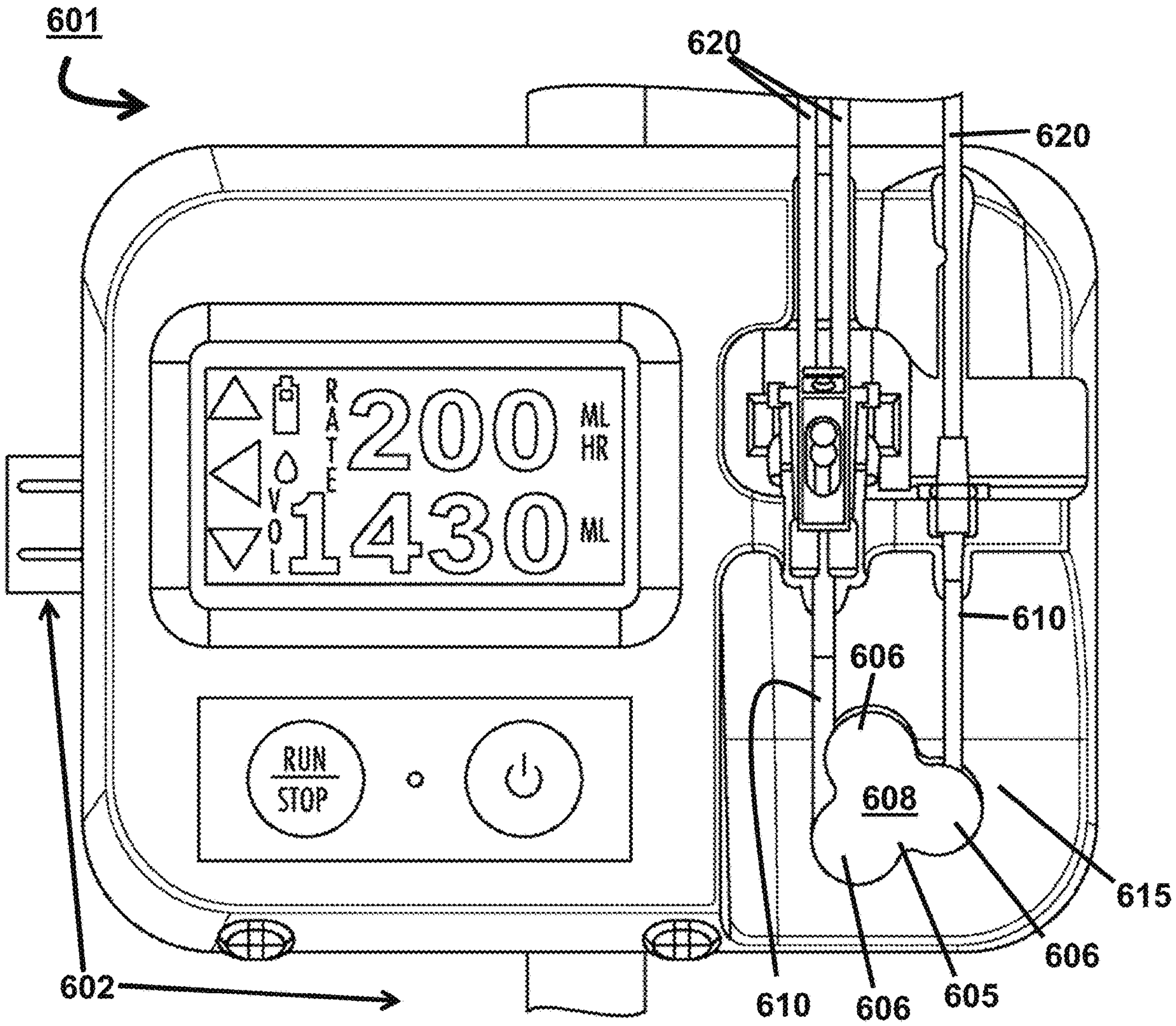
FIG. 2 shows a front view of another exemplary enteral feeding pump system 601. In general, the technology disclosed herein can work with any enteral feeding pump system that includes a peristaltic feature.

The technology disclosed herein can be utilized on almost any enteral feeding pump system designed. FIG. 2 shows a front view of another exemplary enteral feeding pump system 601. A motor (not visible) is behind external housing plate 615 which is part of the housing of a control unit 602. The motor (not visible, behind external housing plate 615) is affixed to central hub 608 and rotates the rotor 605 which includes rollers 606. The elastomeric tubing section 610 of the disposable tubing set 620 is around the rotor 605.

Figure 3:
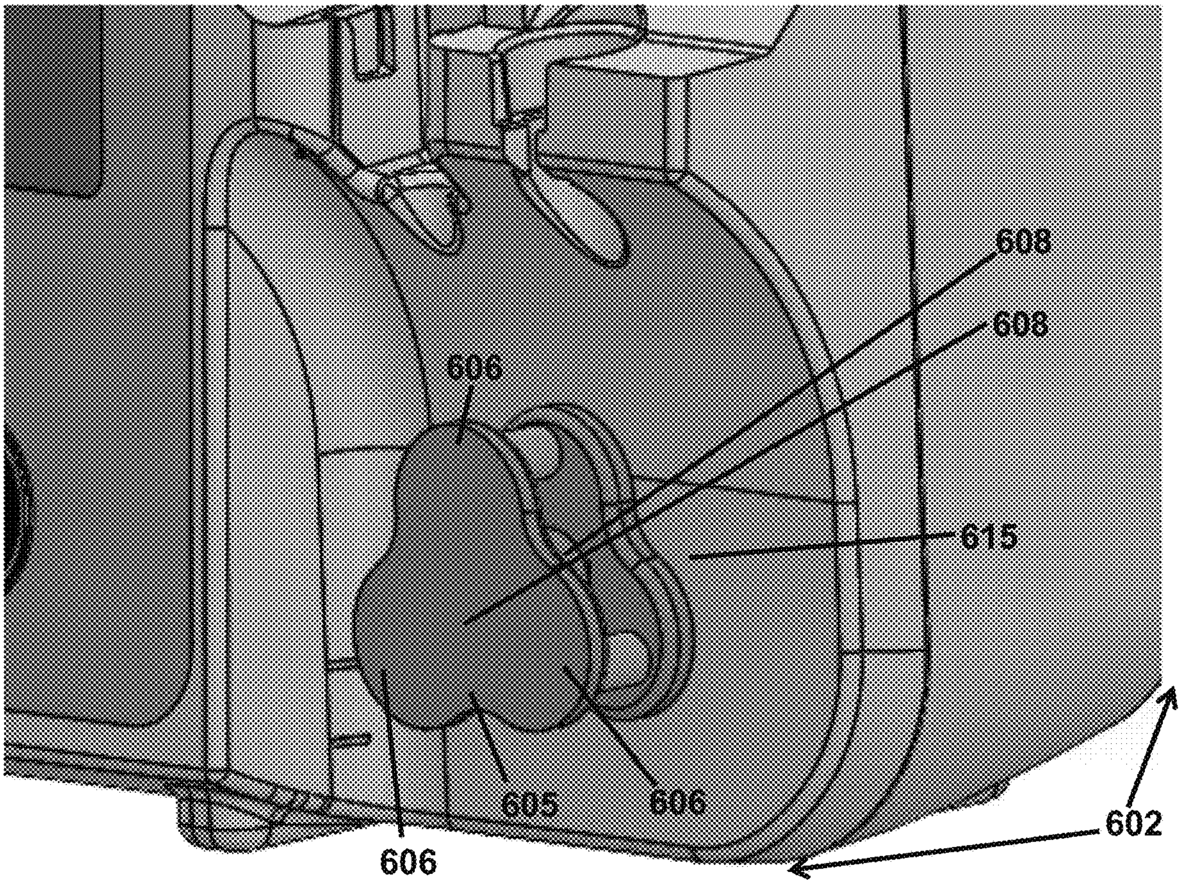
FIG. 3 shows an illustration of an enteral feeding pump rotor.

FIG. 3 shows an illustration of an enteral feeding pump rotor 605 as part of an enlarged view of control unit 602. The rotor 605 has a central hub 608 and has rollers 606. The external housing plate 615 is shown behind the rotor 605 and a motor (not visible) is affixed to the central hub 608 behind the external housing plate 615.

It is important to know that the disposable tubing set is installed on the rotor before pumping can commence. Once pumping has begun, it is important to monitor fluid flow and indicate when conditions are outside of normal limits. The technology disclosed herein provides new systems for automated monitoring. The technology can be lifesaving.

Figure 4:
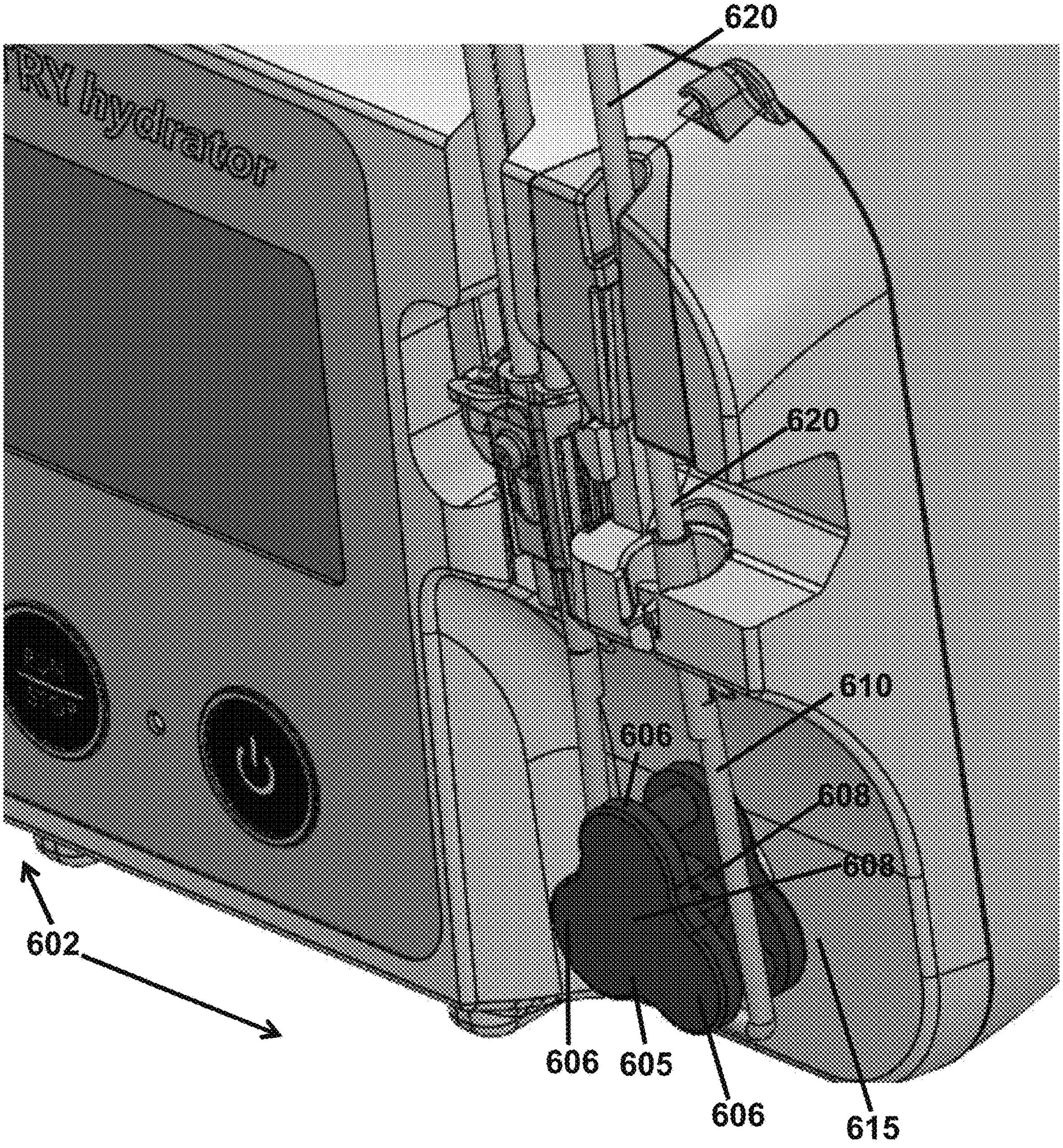
FIG. 4 shows an illustration of an elastomeric peristaltic tube installed in tension against an enteral feeding pump rotor.

FIG. 4 shows an illustration of an elastomeric peristaltic tube or elastomeric tubing section 610 installed in tension against an enteral feeding pump rotor 605. The elastomeric tubing section 610 is part of the disposable tubing set 620. The rotor 605 includes a central hub 608 that is attached to a motor (not visible) that is behind external housing plate 615.

Figure 5:
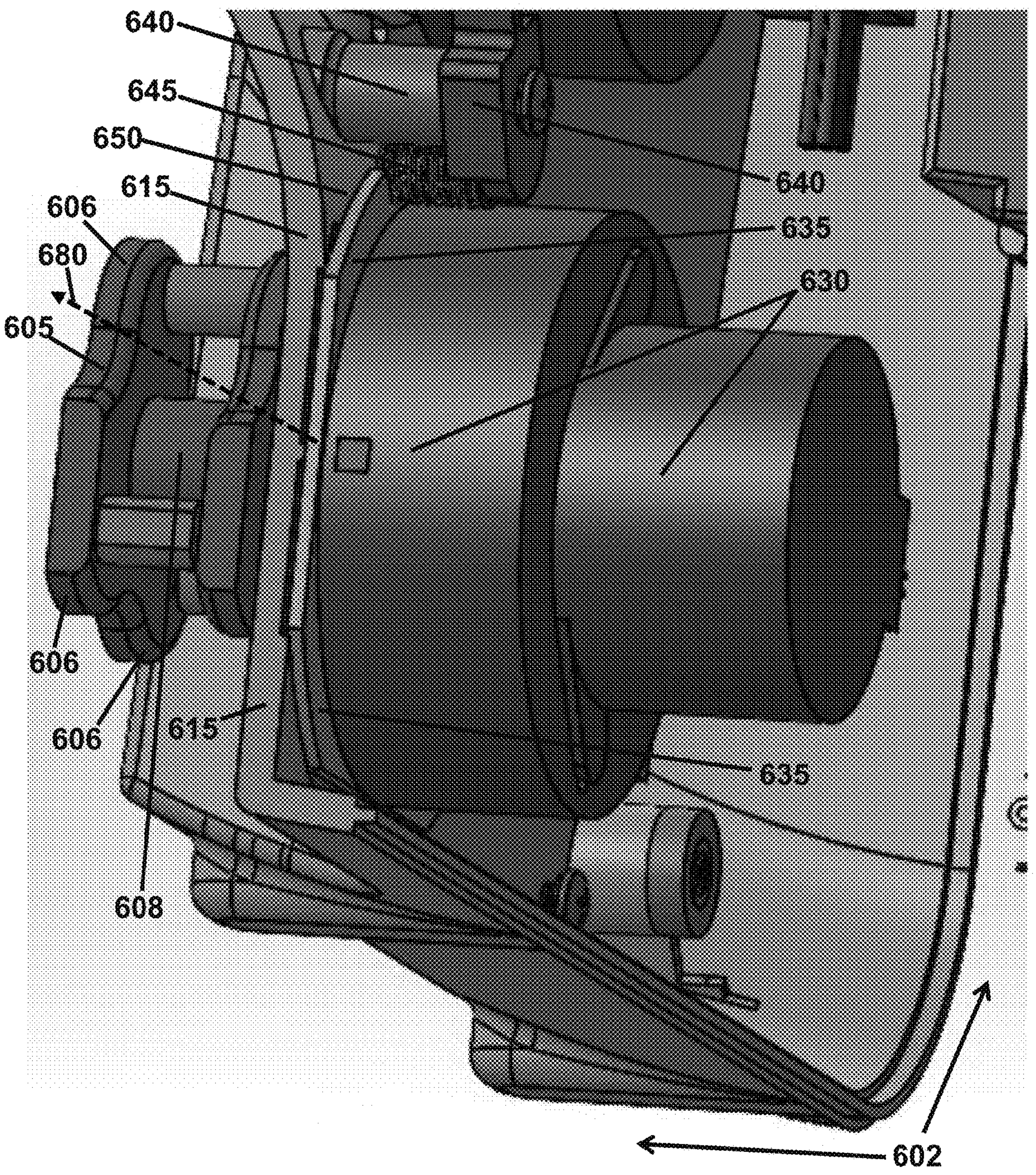
FIG. 5 shows a section view (or internal view) of a motor mounted motor plate in position on horizontal pivot.

In order to see the actual motor, which has not yet been visible in FIG. 4, inside views of the control unit 602 are now provided. In some embodiments, the invention can be described as a revised rotor motor mounting configuration where the motor is mounted on a motor mounting plate 635 which is located on a horizontal pivot 640 which is part of the pump enclosure. FIG. 5 shows a section view of a motor 630 mounted on motor mounting plate 635 in position on a horizontal pivot device 640. In some embodiments, the horizontal pivot device 640 can include a spring 645. A pivot height 650 can be defined as a motion between the motor mounting plate 635 and the external housing plate 615. The motor mounting plate is able to pivot about pivot axis 680. In some embodiments, the pivot height is less than about 1 millimeter (mm) so the movement of the motor-rotor assembly is minimal. In this assembly, the rotor is positioned at a downward angle with respect to horizontal when there is no tubing present. When the tubing is installed, the tension from the elastomeric tubing section causes the rotor to be pulled upward to it normal horizontal operating position.

In some embodiments, the pivot height can be less than about 10 mm, or less than about 5 mm, or less than about 4 mm, or less than about 3 mm, or less than about 2 mm, or optionally less than about 1 mm.

Figure 6:
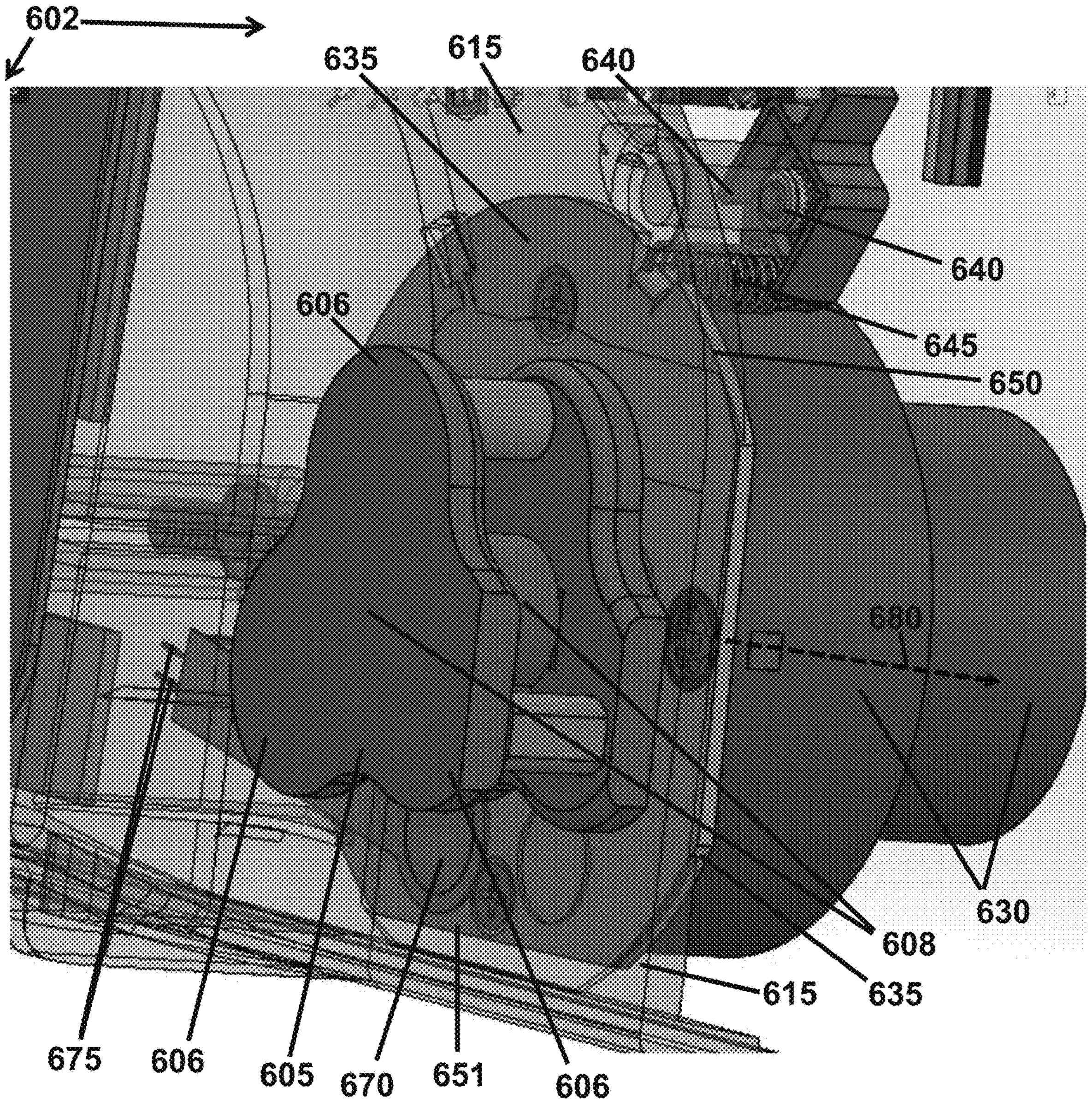
FIG. 6 shows a transparent/section view of a motor plate and force sensitive resistor. The external housing plate 615 is transparent in FIG. 6 so that key features can be visualized.

Turning now to FIG. 6, a force sensitive resistor 670 is installed in a bottom gap 651 formed by the pivot between the motor plate 635 and the pump enclosure inner wall or the inner wall of the external housing plate 615. This device (or force sensitive resistor 670) changes resistance inversely to the applied force. Once tubing is installed on rotor 605, the force of the installed tubing is sufficient to cause a detectable signal that can be interpreted as proper tubing installation. The motor 630 is installed on the motor mounting plate 635, which can pivot and has a pivot height 650 along with a bottom gap 651. When no tubing is installed on the rotor 605, the bottom gap 651 has minimal pressure on the force sensitive resistor 670.

Figure 9:
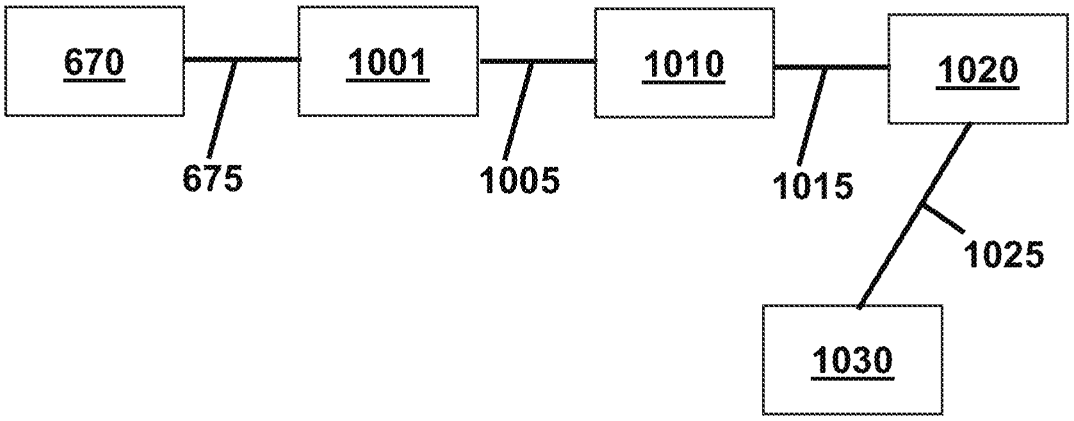
FIG. 9 shows a schematic diagram of electronic processing, a microcomputer, and data transmission options.

The force sensitive resistor 670, in some embodiments, includes electrical contacts 675 that are in electrical communication with wires, an optional computer, and optional wireless technology (FIG. 9). In addition, the baseline resistance that results from the tubing installation prior to pump operation is relatively stable. Once pump operation begins, the resistance value varies in a cyclical manner. The varying resistance is caused by the pulsating force produced when the rollers 606 on the rotating rotor are loaded and unloaded from tension.

When there is normal flow through the tubing, the pulsating resistance signal can be quantified and becomes a reference value. A change in flow caused by a downstream blockage produces a backpressure that is reflected by a higher amplitude in the pulsing resistance signal. The higher amplitude resistance signal, which exceeds a predetermined limit, stops pump operation and produces an alarm warning. In some embodiments, the alarm warning can be sent via WiFi to a healthcare provider. In some embodiments, the entire flow can be monitored by a healthcare provider on a smartphone.

Figure 7:
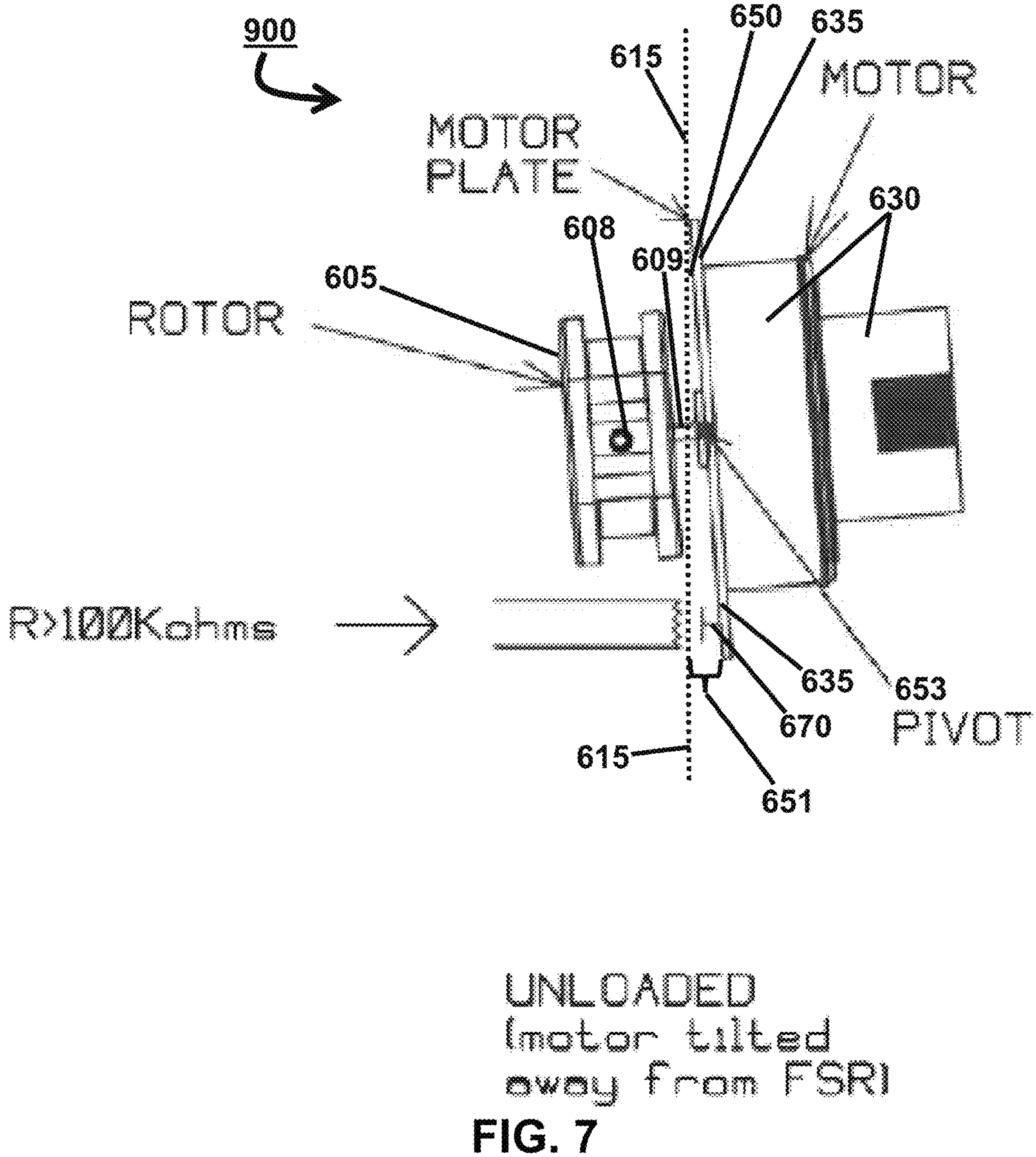
FIG. 7 shows a schematic view of a set detection function in an unloaded state 900.

FIG. 7 shows a schematic view of a set detection function in an unloaded state 900. No elastomeric tubing section 610 is installed on the rotor 605 in FIG. 7. The motor 630 is attached to central hub 608 via a motor shaft 609 that has a pivot 653 through the external housing plate 615. The pivot height 650 is minimal, and a pivot gap 651 is open, so minimal pressure is on the force sensitive resistor 670 when no elastomeric tubing section 610 is installed. At left, the resistance is illustrated as greater than about 100 KOhms, for example. The rotor 605 is tilted downward in relation to the horizontal defined by the external housing plate 615. The pivot height 650 is measured as a gap between the inside surface of the external housing plate 615. The bottom gap 651 is a gap between the inside surface of the external housing plate 615.

In some embodiments, the bottom gap 651 can be less than about 10 mm, or less than about 5 mm, or less than about 4 mm, or less than about 3 mm, or less than about 2 mm, or optionally less than about 1 mm.

It is important to note that in some embodiments, the bottom gap 651 can be zero. In some embodiments, the pivot height 650 can be zero. The technology can rely on a force sensor and not require a gap or a pivot height.

Figure 8:
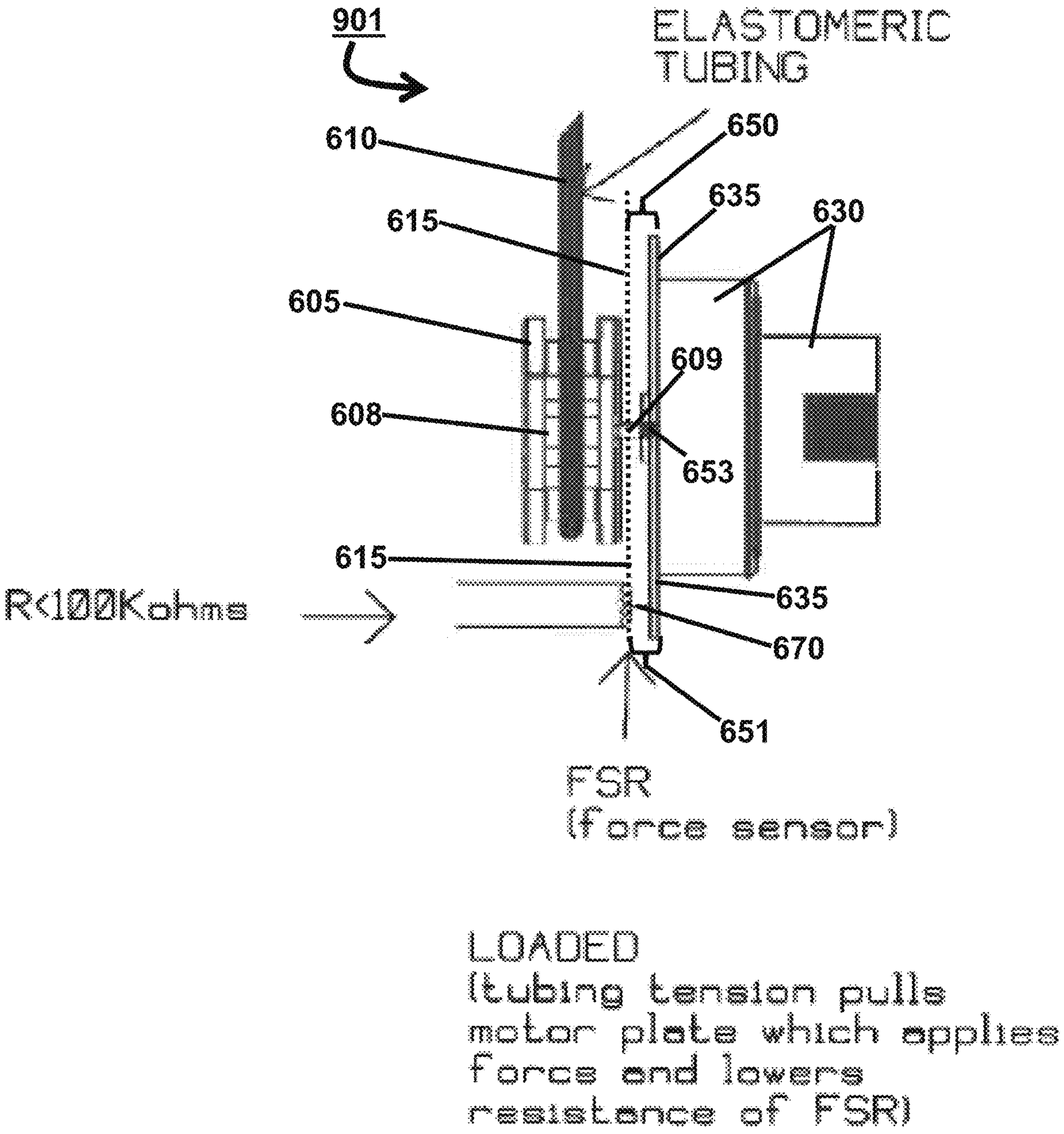
FIG. 8 shows a schematic view of a set detection function in a loaded state 901.

FIG. 8 shows a schematic view of a set detection function in a loaded state 901. The disposable tubing set 620 has been installed including the elastomeric tubing section 610 on the rotor 605. Now, the bottom gap 651 is minimal and compression on the force sensitive resistor 670 (FSR) has initiated. The pivot height 650 has increased as the motor 630 and the motor shaft 609 have both pivoted on pivot 653 to be about orthogonal to the external housing plate 615.

In some embodiments, the force sensitive resistor 670 can include electrical contacts 675 that are in contact with wires 1001 (FIG. 9). The wires 1001 can optionally lead to an analog to digital converter 1005, which is in electrical communication with a processor 1010. In some embodiments, the processor 1010 provides a signal 1015 to a wireless transmitter 1020, which transmits a wireless signal 1025. The wireless signal 1025 can be, in some embodiments received by a receiver 1030. The receiver 1030 can be a smartphone or an app on a computer or smartphone that alerts a healthcare provider. The receiver can be a wearable technology, or any receiver known in the art.

The technology herein can be described in terms of features, aspects, and embodiments of intelligent systems. In some embodiments, the techniques described herein relate to a system, including: a structure with a pivot mechanism that moves in response to force; a fluid pump that moves fluid; a force-responsive electrical component that changes electrical properties in response to force, and alters resistance in presence of an obstruction; a computing device that transmits an alert to a recipient; wherein the force-responsive electrical component provides an electrical response in proportion to tension on a conduit, and decreases resistance when there is an obstruction in the conduit, and wherein the computing device sends an alert signal to a recipient when the electrical response indicates an obstruction in the conduit.

According to some aspects, the techniques described herein relate to a system, wherein the structure with a pivot mechanism is a motor mount with a horizontal pivot.

In some embodiments, the techniques described herein relate to a system, wherein the fluid pump is an enteral feeding pump that uses elastomeric tubing for pumping liquid nutrients.

In some aspects, the techniques described herein relate to a system, wherein the force-responsive electrical component is a force sensitive resistor.

In some embodiments, the techniques described herein relate to a system, wherein the computing device is a microcomputer that sends an emergency signal to a healthcare provider.

According to some aspects, the techniques described herein relate to a system, further including a rotating component with sequence that experiences cyclical load changes due to tension.

In some embodiments, the techniques described herein relate to a system, wherein the rotating component with sequence is a rotating rotor that is loaded and unloaded from tension.

In some aspects, the techniques described herein relate to a system, further including a load-bearing components that are part of the moving component.

In some embodiments, the techniques described herein relate to a system, wherein the load-bearing components are rollers on the rotating rotor.

According to some aspects, the techniques described herein relate to a system, further including a cyclical force that is generated when the components on the moving component experience cyclical load changes.

In some embodiments, the techniques described herein relate to a method, including: moving a structure with a pivot mechanism in response to force; moving fluid with a fluid pump; changing electrical properties of a force-responsive electrical component in response to force, and altering resistance of the force-responsive electrical component in presence of an obstruction; transmitting an alert from a computing device to a recipient; wherein the force-responsive electrical component provides an electrical response in proportion to tension on a conduit, and decreases resistance when there is an obstruction in the conduit, and wherein the computing device sends an alert signal to a recipient when the electrical response indicates an obstruction in the conduit.

In some aspects, the techniques described herein relate to a method, wherein the structure with a pivot mechanism is a motor mount with a horizontal pivot.

In some embodiments, the techniques described herein relate to a method, wherein the fluid pump is an enteral feeding pump that uses elastomeric tubing for pumping liquid nutrients.

According to some aspects, the techniques described herein relate to a method, wherein the force-responsive electrical component is a force sensitive resistor.

In some embodiments, the techniques described herein relate to a method, wherein the computing device is a microcomputer that sends an emergency signal to a healthcare provider.

In some aspects, the techniques described herein relate to a method, further including a rotating component with sequence that experiences cyclical load changes due to tension.

In some embodiments, the techniques described herein relate to a method, wherein the rotating component with sequence is a rotating rotor that is loaded and unloaded from tension.

According to some aspects, the techniques described herein relate to a method, further including a load-bearing components that are part of the moving component.

In some embodiments, the techniques described herein relate to a method, wherein the load-bearing components are rollers on the rotating rotor.

In some aspects, the techniques described herein relate to a method, further including a cyclical force that is generated when the components on the moving component experience cyclical load changes.

In some embodiments, the techniques described herein relate to a system for detecting a normal fluid flow through an enteral feeding pump and for detecting an abnormal fluid flow or a lack of flow through the pump, the system including: a motor mounted to a pivotable motor mounting plate, the motor including a motor shaft that extends through an external housing and that pivots, along with the motor mounting plate, along a pivot axis in a response to a force applied to a central hub supporting a rotor outside of the external housing from a peristaltic pumping of an elastomeric tubing section wrapped on the rotor; wherein the motor mounting plate is freely pivotable along the pivot axis, and the motor mounting plate is operative to compress a force sensor, operative to detect a normal flow or an abnormal flow, between an internal side of the external housing plate and the motor mounting plate in the response to the force from the peristaltic pumping; wherein the rotor functions to accept the elastomeric tubing section, and rollers on the rotor function to pump a fluid through the elastomeric tubing section when the motor turns the motor shaft in the peristaltic pumping of the elastomeric tubing; and wherein when the elastomeric tubing section is installed on the rotor, and the motor shaft is turning, and a normal fluid flow is established through the pump, a pressure on the force sensor is in a normal peristaltic state; wherein when a clog or a malfunction occurs in the elastomeric tubing section, an altered pressure on the force sensor is operative to indicate an abnormal or a clogged state in the elastomeric tubing section.

According to some aspects, the techniques described herein relate to a system, wherein the sensor includes a force sensitive resistor.

In some embodiments, the techniques described herein relate to a system, wherein the system includes a gap between the motor mounting plate and the internal side of the external housing plate when there is not an elastomeric tubing section on the roller.

In some aspects, the techniques described herein relate to a system, wherein the motor shaft is disposed at an acute angle in relation to a plane defined by the external housing when there is not an elastomeric tubing section on the roller.

In some embodiments, the techniques described herein relate to a system, wherein the motor shaft is disposed about orthogonal to the external house when there is an elastomeric tubing section on the roller.

According to some aspects, the techniques described herein relate to a system, wherein when an elastomeric tubing section is affixed around the rotor, an elastomeric tension on the elastomeric tubing section is operative to cause a tilt in the pivotable motor mounting plate, and the tilt causes a pressure between the motor mounting plate and the internal side of the external housing plate; said pressure causing a change in a state of the force sensor.

In some embodiments, the techniques described herein relate to a system, further including one or more electrical connections between the force sensor and a processor; said processor operative to indicate an alarm state when the force sensor detects an abnormal flow or a lack of flow.

In some aspects, the techniques described herein relate to a system, further including one or more electrical connections between the force sensor and a processor, and a wireless transmission device operative to transmit an alarm signal when the force sensor detects an abnormal flow or a lack of flow.

In some embodiments, the techniques described herein relate to a system, wherein the force sensor is operative to perform a shut off of the motor when the force sensor detects an abnormal flow or a lack of flow.

According to some aspects, the techniques described herein relate to a system, wherein the pivotable motor mount includes one or more springs or spring mechanisms operative to push the pivotable motor mount against the internal side of the external housing plate so that the pivotable motor mount is not parallel to the external housing plate when no elastomeric tubing section is on the rotor.

In some embodiments, the techniques described herein relate to a system, further including a computer with software and memory operative to store a normal electrical output for the sensor and 1) to detect an abnormal electrical output from the sensor and to 2) transmit an alarm to a healthcare provider when the abnormal electrical output is detected.

In some aspects, the techniques described herein relate to a method for monitoring a fluid flow from an enteric feeding pump, the method including the steps of: (1) obtaining a system including: a motor mounted to a pivotable motor mounting plate, the motor including a motor shaft that extends through an external housing and that pivots, along with the motor mounting plate, along a pivot axis in a response to a force applied to a central hub supporting a rotor outside of the external housing from a peristaltic pumping of an elastomeric tubing section wrapped on the rotor; wherein the motor mounting plate is freely pivotable along the pivot axis, and the motor mounting plate is operative to compress a force sensitive resistor, operative to detect a normal flow or an abnormal flow, between an internal side of the external housing plate and the motor mounting plate in the response to the force from the peristaltic pumping; wherein the rotor functions to accept the elastomeric tubing section, and rollers on the rotor function to pump a fluid through the elastomeric tubing section when the motor turns the motor shaft in the peristaltic pumping of the elastomeric tubing; wherein when the elastomeric tubing section is installed on the rotor, and the motor shaft is turning, and a normal fluid flow is established through the pump, a pressure on the force sensitive resistor is in a normal peristaltic state; wherein when a clog or a malfunction occurs in the elastomeric tubing section, an altered pressure on the force sensitive resistor is operative to indicate an abnormal or a clogged state in the elastomeric tubing section; (2) establishing a normal fluid flow through the enteric feeding pump; and (3) waiting for a sufficient period of time for the force sensitive resistor to indicate the abnormal or the clogged state in the elastomeric tubing section.

In some embodiments, the techniques described herein relate to a method, wherein the system further includes a computer with software and memory operative to store a normal electrical output for the sensor, operative to detect an abnormal electrical output from the sensor, and operative to transmit an alarm to a healthcare provider when the abnormal electrical output is detected.

According to some aspects, the techniques described herein relate to a method, wherein the method further includes waiting for a sufficient period 12, wherein when an elastomeric tubing section is affixed around the rotor, an elastomeric tension on the elastomeric tubing section is operative to cause a tilt in the pivotable motor mounting plate, and the tilt causes a pressure between the motor mounting plate and the internal side of the external housing plate; said pressure causing a change in a state of the force sensitive resistor.

In some embodiments, the techniques described herein relate to a method, wherein the system is further including one or more electrical connections between the force sensing resistor and a processor; said processor operative to indicate an alarm state when the force sensing resistor detects an abnormal flow or a lack of flow.

In some aspects, the techniques described herein relate to a method, wherein the method is a continuous method but wherein the force sensor is operative to perform a shut off of the motor when the force sensor detects an abnormal flow or a lack of flow.

In some embodiments, the techniques described herein relate to a method, wherein the pivotable motor mount includes one or more springs or spring mechanisms operative to push the pivotable motor mount against the internal side of the external housing plate so that the pivotable motor mount is not parallel to the external housing plate when no elastomeric tubing section is on the rotor.

According to some aspects, the techniques described herein relate to a kit for upgrading an enteric feeding pump so that the enteric feeding pump can detect a normal fluid flow through the enteral feeding pump and can detect an abnormal fluid flow or a lack of flow through the pump after the upgrade, the kit including: A) a pivotable motor mounting plate operative to mount a motor upon the plate, the motor including a motor shaft that extends through an external housing and that pivots, along with the motor mounting plate, along a pivot axis in a response to a force applied to a central hub supporting a rotor outside of the external housing from a peristaltic pumping of an elastomeric tubing section wrapped on the rotor; a force sensor, wherein the motor mounting plate is freely pivotable along the pivot axis, and the motor mounting plate is operative to compress the force sensor, operative to detect a normal flow or an abnormal flow, between an internal side of the external housing plate and the motor mounting plate in the response to the force from the peristaltic pumping; wherein the rotor functions to accept the elastomeric tubing section, and rollers on the rotor function to pump a fluid through the elastomeric tubing section when the motor turns the motor shaft in the peristaltic pumping of the elastomeric tubing; wherein when the elastomeric tubing section is installed on the rotor, and the motor shaft is turning, and a normal fluid flow is established through the pump, a pressure on the force sensor is in a normal peristaltic state; wherein when a clog or a malfunction occurs in the elastomeric tubing section, an altered pressure on the force sensor is operative to indicate an abnormal or a clogged state in the elastomeric tubing section; and B) instructions for installing one or more parts in A) above and instructions for use.

In some embodiments, the techniques described herein relate to a kit, wherein the force sensor includes a force sensitive resistor, and wherein the kit is configured to electrically connect the force sensitive resistor to a computer with software and WiFi.

In any interpretation of the claims appended hereto, it is noted that no claims or claim elements are intended to invoke or be interpreted under 35 U.S.C. 112 (f) unless the words “means for” or “step for” are explicitly used in the particular claim.

In general, any combination of disclosed features, components and methods described herein is possible. Steps of a method can be performed in any order that is physically possible.

All cited references are incorporated by reference herein. Although embodiments have been disclosed, it is not desired to be limited thereby. Rather, the scope should be determined only by the appended claims.

While various embodiments of the present disclosure have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure. The methods, kits, formulations, and devices disclosed herein can be combined in any way into systems to address the current public health emergency.

The machine learning methods and artificial intelligence methods described herein can be implemented in any suitable computing system. The computing system can be implemented as or can include a computer device that includes a combination of hardware, software, and firmware that allows the computing device to run an applications layer or otherwise perform various processing tasks. Computing devices can include without limitation personal computers, workstations, servers, laptop computers, tablet computers, mobile devices, wireless devices, smartphones, wearable devices, embedded devices, microprocessor-based devices, microcontroller-based devices, programmable consumer electronics, mini-computers, main frame computers, and the like and combinations thereof.

Processing tasks can be carried out by one or more processors. Various types of processing technology can be used including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by a system bus or in any other manner. Memory can store control logic, instructions, and/or data. Memory can include transitory memory, such as cache memory, random access memory (RAM), static random-access memory (SRAM), main memory, dynamic random-access memory (DRAM), block random access memory (BRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one-time programmable non-volatile memory (OTPNVM), hard disk drives, optical storage devices, compact disc drives, flash drives, floppy disk drives, magnetic tape drives, memory chips, and memristor memory cells. Non-transitory memory can be provided on a removable storage device.

A computer-readable medium can include any physical medium that is capable of encoding instructions and/or storing data that can be subsequently used by a processor to implement embodiments of the systems and methods described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in the systems and methods described herein.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities Network connection enables the computing device to communicate and interact with any combination of remote devices, remote networks, and remote entities via a communications link. The communications link can be any type of communication link including without limitation a wired or wireless link. For example, the network connection can allow the computing device to communicate with remote devices over a network which can be a wired and/or a wireless network, and which can include any combination of intranet, local area networks (LANs), enterprise-wide networks, medium area networks, wide area networks (WANS), virtual private networks (VPNs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission to and receipt of data via the communications link. A transceiver can include one or more devices that both transmit and receive signals, whether sharing common circuitry, housing, or a circuit boards, or whether distributed over separated circuitry, housings, or circuit boards, and can include a transmitter-receiver.

The computing device can include a browser and a display that allow a user to browse and view pages or other content served by a web server over the communications link. A web server, sever, and database can be located at the same or at different locations and can be part of the same computing device, different computing devices, or distributed across a network. A data center can be located at a remote location and accessed by the computing device over a network. The computer system can include architecture distributed over one or more networks, such as, for example, a cloud computing architecture. Cloud computing includes without limitation distributed network architectures for providing, for example, software as a service (SaaS).

The technology described herein is further illustrated by the following examples which in no way should be construed as being further limiting. The Examples are provided to demonstrate examples of future planned work, which in some experiments is emergency work. Although methods and materials similar or equivalent to those described herein can be used in the practice or testing of this disclosure, suitable methods and materials are described below.

EXAMPLES

The invention now being generally described with the spirit of the invention and inventive concept described and illustrated, it will be more readily understood by reference to the following examples which are included merely for purposes of illustration of certain aspects and embodiments of the present invention and are not intended to limit the invention. As can be discerned, the technology herein provides a great improvement in monitoring enteral feeding pumps, and by helping quality of life, long-term, for patients, it is foreseen that the technology will grow.

Example 1

Testing Alert Signals From the Force Sensitive Resistor

Figure 10:
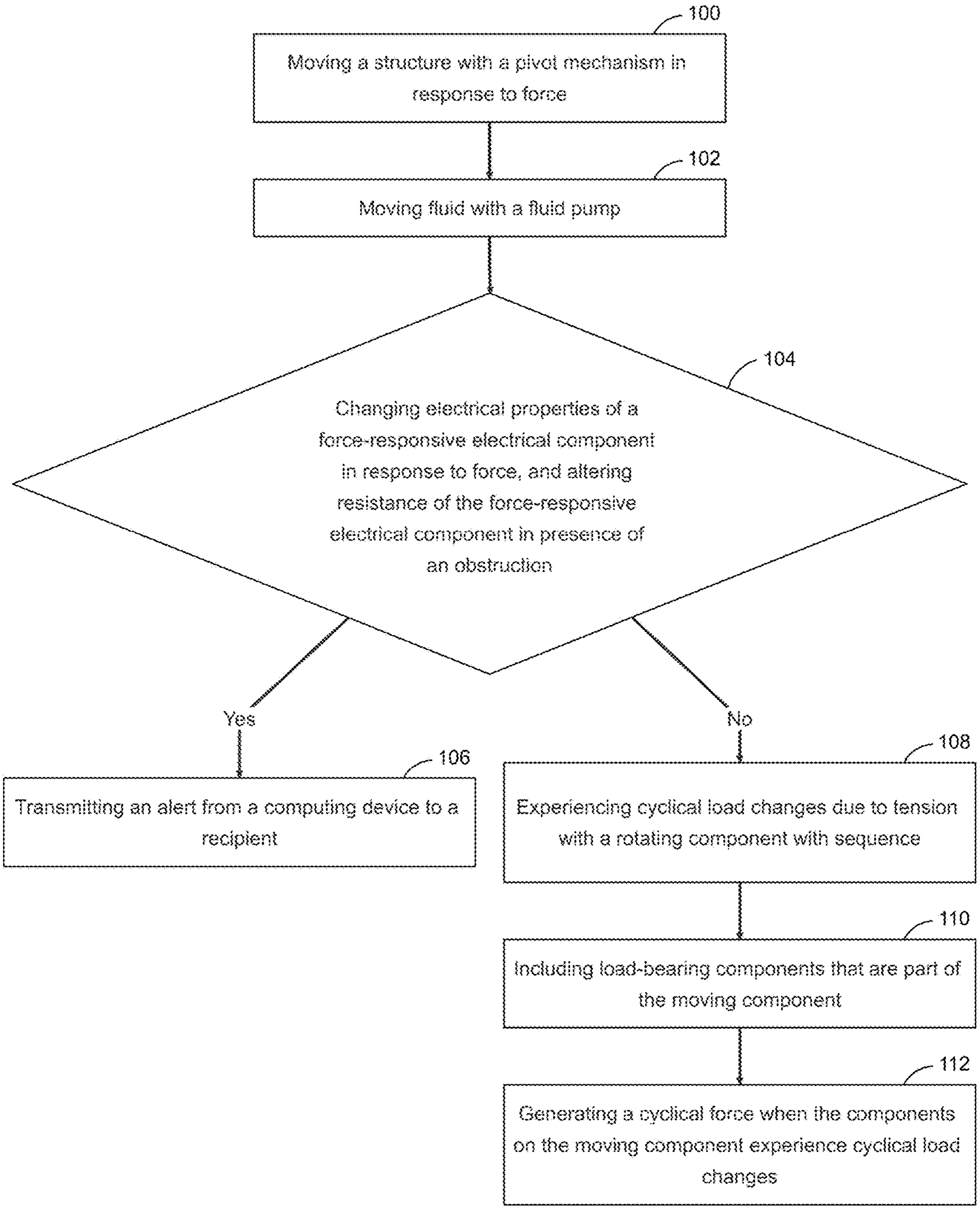
FIG. 10 shows, in a flowchart, operations for moving a structure with a pivot mechanism in response to force in an enteral feeding pump.

In this prophetic example, various computer transmissions are tried to alert a healthcare provider to an emergency condition in an enteral feeding pump. For example, smartphone signals can be transmitted to the healthcare provider from the systems disclosed herein. FIG. 10 shows, in a flowchart, operations for moving a structure with a pivot mechanism in response to force in an enteral feeding pump and for transmitting the signal from a computing device to a recipient (the healthcare provider).

In FIG. 10, Step 100 involves the movement of a motor mount that is connected to a horizontal pivot. This movement occurs as a response to force, which is the tension on elastomeric tubing used in a feeding pump system. The motor mount pivots around the horizontal pivot when the tension in the tubing changes, which can happen during normal operation or when there is an increase in tension due to a blockage.

A sub-step specifies that the pivot mechanism is a horizontal pivot. The horizontal pivot serves as an axis for the motor mount to rotate or pivot in response to the mechanical force exerted on the tubing by the pump's action. The motor mount's movement is designed to be proportional to the force applied to the tubing, allowing for detection of changes in tension.

The components involved in step 100 and the sub-step include the motor mount, the horizontal pivot, the motor, the elastomeric tubing, and a sensor that detects changes in force. The motor mount and horizontal pivot function as a mechanical system that translates the tension in the tubing into a measurable movement. The motor drives the pump mechanism, which compresses the tubing to move fluid through it. The sensor, which is sensitive to changes in force, measures the resistance change associated with the motor mount's movement. It should be understood that the sensor can measure other changes besides resistance, such as a movement captured by a light or a laser.

The purpose of these components and their interactions is to monitor the performance of the feeding pump and to detect any malfunctions, such as blockages in the tubing, that could disrupt the delivery of nutrients. The system comprising the motor mount and sensor provides a means to monitor the pump's operation and maintain patient safety by detecting irregularities in the pump's function.

Step 102 involves the operation of a fluid pump, specifically designed for the delivery of liquid nutrients through tubing. This pump functions by rhythmically compressing the tubing to create a peristaltic motion that propels the liquid through the system and into a patient's digestive tract. The pump is a component of a medical device system that provides nutrition to patients who are unable to consume food orally.

A sub-step of 102 specifies that the pump in question is an enteral feeding pump and that the tubing used is made of elastomeric material. The enteral feeding pump operates by engaging with the elastomeric tubing, which possesses the necessary properties to be compressed and then return to its shape, facilitating the movement of liquid nutrients. The tubing's design allows for the repeated application of force by the pump's mechanism, which is necessary for the continuous flow of nutrients.

The pump and the tubing are designed to work together, with the pump applying force to the tubing and the tubing's properties allowing for the creation of a wave-like motion that transports the nutrients. The system ensures that the delivery of nutrition is maintained at a consistent rate, as required for patient care. The design of the pump and the selection of tubing material are aligned with the need to provide a reliable and effective means of nutrition delivery. In some embodiments, a computer with memory can record the wave-like motion and compare the recording to current waves from the pump to sound an alarm state when the normal, recorded wave-like motion is not a match with the pump's current state of operation.

Step 104 involves a process where the electrical properties of a force-sensitive component are altered in response to applied force, and the resistance of this component changes when an obstruction is present. The force-sensitive component can be a force sensitive resistor (FSR). The FSR operates on the principle that its resistance varies when pressure is applied to it. This component can be, in some embodiments, typically a thin film that can be placed in locations where pressure changes are expected.

When tension occurs in the elastomeric tubing, such as from a clog, the force exerted on the FSR increases, leading to a decrease in its electrical resistance. The change in resistance is proportional to the force applied, enabling the system to detect variations in tension that signal a clog.

The FSR is integrated into an electrical circuit (e.g., FIG. 9) within the pump system. It is connected to the tubing, the motor mount, and the fluid within the tubing. The FSR is designed to be sensitive to pressure changes, allowing it to serve as a feedback mechanism to monitor the pumping process.

The change in resistance detected by the FSR is processed by a microcomputer within the system. When the resistance falls below a predetermined threshold, indicative of a clog, the microcomputer processes this information and initiates an alert to notify healthcare providers of the issue. This alert mechanism allows for timely intervention to resolve the obstruction and ensure the continuation of nutrient delivery.

In summary, step 104 describes the mechanism by which the system detects obstructions in the tubing. The FSR is the key component that changes its electrical resistance in response to force from tension in the tubing. This change is monitored by the system's microcomputer, which then takes action to alert healthcare providers of a potential clog.

Step 106 involves the process of sending an alert from a computing device to a designated recipient when an obstruction is detected in the tubing of a feeding pump. The computing device, as detailed in a sub-step of 106, can be a microcomputer that is configured to monitor signals from a force sensitive resistor. This resistor alters its resistance in response to tension changes in the tubing, which can indicate the presence of a clog.

When the microcomputer receives a signal that suggests an obstruction, it activates a protocol to notify a healthcare provider. This notification can manifest in various forms, such as an alarm on the device, a message on a connected interface, or a communication sent through a network to a digital device used by healthcare personnel. An emergency alert on a smartphone can be effective.

The microcomputer's role in this step is to process the input from the force sensitive resistor and execute the necessary steps to generate an alert. The purpose of this process is to inform healthcare personnel of the situation so they can address the obstruction, ensuring the uninterrupted delivery of nutrition to the patient and preventing potential health complications.

In essence, Step 106 and a sub-step of 106 describe the mechanism by which the system detects an obstruction and communicates this information to healthcare providers to facilitate a timely response to maintain patient care.

Step 108 involves a process where a rotating rotor undergoes cyclical load changes due to tension. This rotor is part of a pump mechanism designed to move fluid through elastomeric tubing. As the rotor rotates, rollers attached to it periodically compress and release the tubing. This compression and release cycle is necessary to propel the fluid within the tubing.

Step 108 also specifies that the rotating rotor experiences tension as the rollers engage with the tubing, creating a zone of compression that facilitates fluid movement. Once the rollers pass over the tubing, the tension is released, allowing the tubing to return to its original shape before the next roller applies pressure again. This sequence of loading and unloading tension is repeated with each rotation of the rotor, resulting in a pulsating force that is essential for the operation of the pump.

The interaction between the rollers and the tubing must be precise to ensure efficient fluid movement without causing damage. The design of the rotor and the placement of the rollers are structured to apply the correct amount of pressure to the tubing. The cyclical load changes are a direct result of the rotor's design and function.

The purpose of these interactions is to maintain a consistent flow of fluid to the patient. Any deviation from the expected pattern of resistance changes, as detected by a sensor, can indicate an obstruction or malfunction within the system. This detection mechanism allows for a timely response to potential issues with the fluid delivery process, ensuring the safety and well-being of the patient.

Step 110 involves the integration of components that support and bear forces during the operation of a feeding pump. These components must withstand the mechanical stress and tension generated by the movement of tubing and the rotation of the rotor.

Step 110 also specifies that these components are rollers on the rotor. Rollers are cylindrical elements positioned on the rotor to engage with the tubing, applying pressure at intervals to facilitate the movement of liquid nutrients. Their function is to create a peristaltic motion, which mechanically mimics wave-like contractions that move food in the digestive tract. As the rotor turns, the rollers press against the tubing, occluding it momentarily and pushing the fluid forward in a cyclical manner, establishing a continuous flow.

The design and placement of the rollers ensure that the tubing is compressed with an appropriate amount of force, avoiding damage to the tubing while ensuring efficient fluid movement. The materials for the rollers must be durable and compatible with the tubing to prevent wear or chemical reactions that could compromise the system's performance.

In summary, Step 110 describes the inclusion and function of rollers on the rotor within a feeding pump system. These rollers are pivotal in generating the peristaltic pumping action required to move liquid nutrients through the tubing, and their design is a key factor in the pump's efficiency and reliability.

Step 112 involves the generation of a cyclical force as a result of load changes on the moving components of a pump mechanism. Specifically, this step pertains to the action of rollers on a rotating rotor that compress and release elastomeric tubing in a repetitive manner. The loading phase occurs when the rollers apply pressure to the tubing, propelling the fluid within. Conversely, the unloading phase happens as the rollers retract, allowing the tubing to resume its shape and draw in more fluid. This sequence of compression and relaxation creates a pulsating force that is inherent to the operation of peristaltic pumps.

The force-sensitive resistor (FSR) is tasked with monitoring the force exerted on the tubing. During normal operation, the FSR registers the variations in tension associated with the cyclical engagement and disengagement of the rollers. An increase in tension, potentially caused by an obstruction in the tubing, results in a decrease in the electrical resistance measured by the FSR. This change is processed by a microcomputer, which is programmed to interpret such variations as indicative of a blockage, subsequently initiating a signal to a healthcare provider.

The components involved in step 112 include the rotating rotor, the rollers, the elastomeric tubing, the FSR, and the microcomputer. The rollers are responsible for creating the pulsating force necessary for fluid movement. The FSR is responsible for detecting force variations, and the microcomputer processes the data from the FSR to determine the need for alert transmission. This step ensures consistent fluid delivery and timely detection of obstructions for maintaining the pump's operational integrity and ensuring patient safety.

Example 2

Combined Systems Overview

Figure 11:
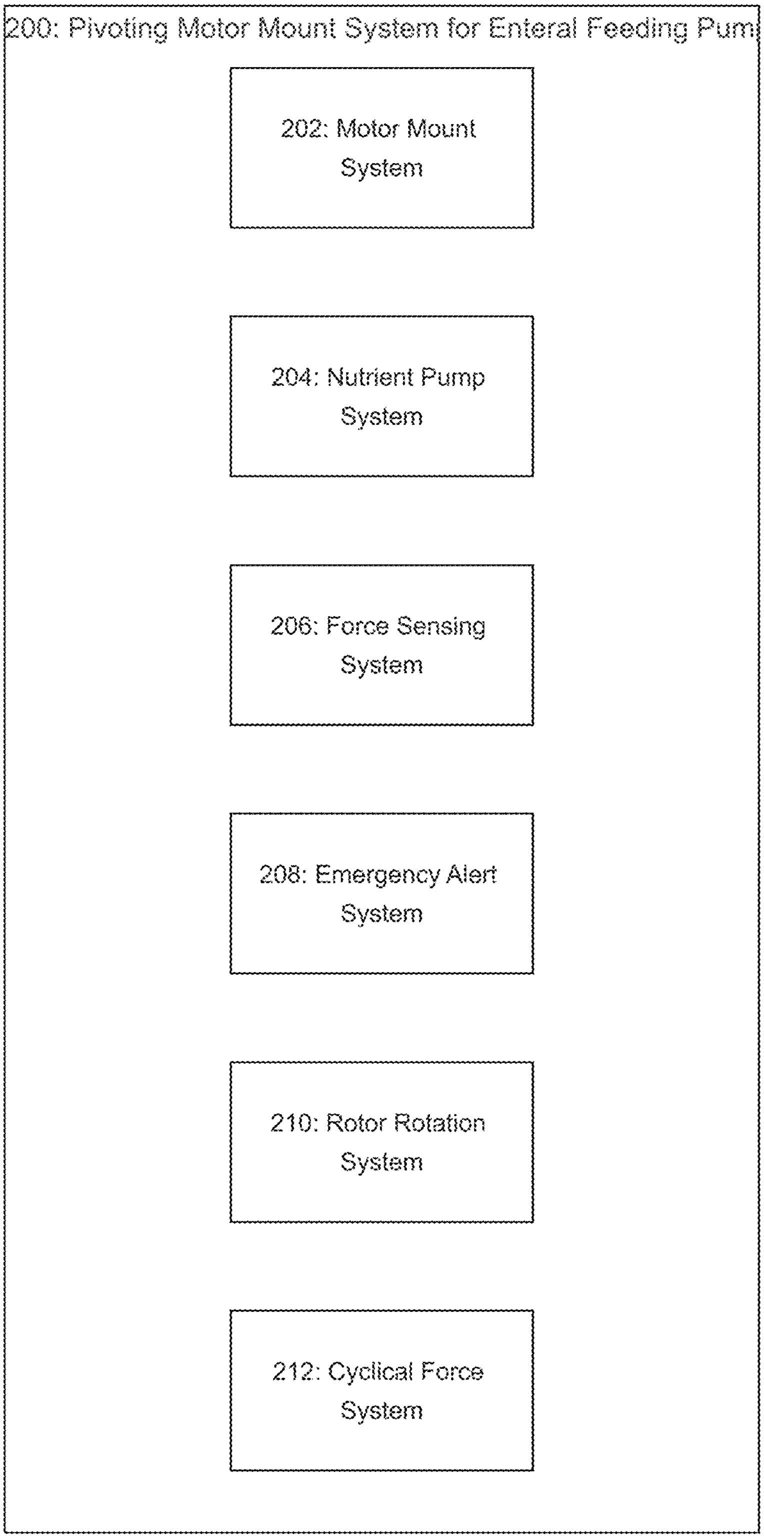
FIG. 11 shows, in a block diagram, a pivoting motor mount system for an enteral feeding pump.

Various components are tested as interconnected systems for a pivoting motor mound system for an enteral feeding pump. FIG. 11 shows, in a block diagram, a pivoting motor mount system for an enteral feeding pump.

In FIG. 11, the Pivoting Motor Mount System for Enteral Feeding Pump (200) ensures precise delivery of nutrients through controlled pumping action. This system includes a Motor Mount System (202) with a Horizontal Pivot Mechanism (not shown), which allows for pivotal movement in response to tension in the tubing.

The Motor Mount System (202) is equipped with a Horizontal Pivot Mechanism that enables the motor to pivot horizontally or vertically. This movement is a response to the mechanical forces exerted by the elastomeric tubing within the Nutrient Pump System (204). As the pump moves fluid, any increase in tension, which may indicate an obstruction, causes the motor mount to pivot. This pivotal movement is crucial for the detection of obstructions and is monitored by the Force Sensing System (206).

The Force Sensing System (206) includes a force sensitive resistor that changes its electrical properties in proportion to the force applied. A change in electrical resistance is indicative of an obstruction in the tubing. These changes are monitored by the Emergency Alert System (208), which includes a microcomputer. The microcomputer interprets the electrical signals from the force sensitive resistor and, upon detecting an obstruction, sends an emergency alert to a healthcare provider. This alert mechanism is essential for maintaining the safety and effectiveness of the enteral feeding process.

The Motor Mount System (202) is a part of the enteral feeding pump, designed to control and respond to fluid flow obstructions. It includes a Horizontal Pivot Mechanism (or vertical and horizontal pivot axis) that allows for movement in response to tubing tension, which is essential for detecting and signaling blockages.

The Motor Mount System (202) consists of the Horizontal Pivot Mechanism that enables the motor mount to pivot vertically, horizontally, or in any axis. This mechanism is responsive to the tension changes in the elastomeric tubing, which can occur during normal operation of the enteral feeding pump or when an obstruction is present. The pivotal movement of the motor mount is a direct response to the force exerted by the tubing.

When the tubing experiences increased tension due to a clog, the pivot mechanism reacts by moving. This movement affects the force sensitive resistor, which is designed to change its electrical resistance in proportion to the force applied. As the tension increases, the resistance can decrease (e.g., FIG. 7, FIG. 8), generating an electrical signal that indicates the presence of an obstruction.

This signal is then transmitted to a microcomputer within the Emergency Alert System (208), which processes the information and sends an alert to a healthcare provider if necessary. The alert is triggered when the electrical response from the force sensitive resistor indicates an obstruction, signaling the need for intervention.

The operation of the Motor Mount System (202) and the Horizontal Pivot Mechanism is through a mechanical linkage to the motor, which is sensitive to the tension on the tubing. This ensures that any fluctuations in tension are quickly and accurately translated into mechanical movement and subsequently into an electrical signal for response.

The Nutrient Pump System (204) is a component in the enteral feeding pump that is responsible for the movement of liquid nutrients. It includes the Elastomeric Tubing Mechanism, which is essential for pumping liquid nutrients. This sub-component ensures the transfer of nutrients by creating a peristaltic motion.

The Nutrient Pump System (204) operates by utilizing a fluid pump mechanism to transport liquid nutrients through elastomeric tubing. The tubing is designed to be flexible, allowing for a peristaltic action that propels the nutrients forward. The peristaltic motion is achieved by the rhythmic contraction and relaxation of the tubing walls, which is orchestrated by a series of rollers that sequentially compress and release the tubing. This action ensures a steady and controlled flow of nutrients. In some embodiments, the elastomeric tubing can be a silicone tubing.

During operation, the system responds to varying levels of resistance within the tubing, which can occur due to changes in fluid viscosity or potential obstructions. The force-sensitive component within the system detects these changes in tension. When the tension increases beyond a certain threshold, indicative of a blockage, the component's electrical resistance is altered. This change in resistance is relayed to a microcomputer (208), which interprets the signal and, if necessary, initiates an alert to a healthcare provider. This alert signifies that intervention may be required to address the obstruction and maintain the delivery of nutrients.

The system's ability to detect and respond to obstructions is vital for patient safety and the continuous operation of the enteral feeding pump. The integration of the force-sensitive component with the microcomputer ensures that any issues are communicated, allowing for swift resolution and minimal disruption to nutrient delivery.

The Force Sensing System (206) is a part of the enteral feeding pump designed to detect and respond to changes in force. This system includes a force-responsive electrical component that changes its electrical properties in response to force, playing a role in the pump's ability to detect obstructions and maintain safe operation.

The Force Sensing System (206) operates using a force-sensitive resistor (FSR) to monitor tension on the elastomeric tubing. The FSR is configured to alter its electrical resistance proportionally to the mechanical force applied. During normal operation of the pump, the rotor with rollers compresses the tubing, creating pulsating forces. However, if an obstruction occurs, the tension in the tubing increases, causing the FSR to decrease its electrical resistance.

This change in resistance is converted into an electrical signal and sent to a microcomputer 1020. The microcomputer processes the signal and, if a resistance drop indicative of a clog is detected, it initiates an emergency alert. This alert is then communicated to healthcare personnel for immediate action to resolve the blockage and ensure patient safety.

The Force Sensing System thus serves as a feedback mechanism, monitoring the enteral feeding pump's operation and alerting medical staff to issues requiring attention.

The Emergency Alert System (208) is a component in the enteral feeding pump system that includes a computing device capable of transmitting alerts. The Healthcare Provider Alert (8-a) is a sub-component that sends emergency signals to healthcare providers.

The computing device within the Emergency Alert System (208) monitors electrical signals from a force-sensitive resistor, which vary in response to tension in the elastomeric tubing. When an obstruction such as a clog occurs, the tension increases, and the resistor changes its resistance. The computing device is configured to differentiate between normal resistance fluctuations and those indicative of a blockage.

Upon detecting a resistance decrease that indicates an obstruction, the computing device activates a communication protocol to generate an alert signal. This signal is sent to designated recipients to prompt immediate action to resolve the malfunction and maintain patient care.

The Healthcare Provider Alert manages the dispatch of the emergency signal using network communication channels. The system may use various methods, including SMS, email, or integration with hospital alert systems, to ensure the alert is received promptly by the healthcare provider.

The Rotor Rotation System (210) plays a role in the operation of an enteral feeding pump, ensuring the movement of fluid through cyclical load changes. This system includes a rotating rotor (210) and rollers that engage with elastomeric tubing to facilitate the pumping of nutrients.

Within the Rotor Rotation System (210), the rotating rotor (210) is responsible for the compression and release of the elastomeric tubing, which is necessary for the movement of liquid nutrients. The rotation of the rotor is synchronized with the operational cycle of the pump, which is essential for maintaining a consistent flow rate of the nutrients.

The rollers 606 are a key component of the system, positioned to apply pressure on the tubing. As the rotor rotates, these rollers create a cyclical load on the tubing, compressing it to move the fluid and then releasing it to allow the tubing to regain its shape. This action generates the pulsating force required for the pump's functionality.

The coordination between the rotor and rollers is maintained to ensure that the tubing is compressed with the right amount of force. This ensures that the tubing is not subjected to excessive wear or damage and that the fluid movement is efficient. The calibration of tension by the rollers is essential for the durability of the tubing and the consistent delivery of nutrients.

The Cyclical Force System (212) is integral to the operation of the enteral feeding pump, ensuring precise fluid movement and detecting obstructions through tension variations. This system includes a cyclical force that is generated when components on the moving component experience cyclical load changes.

The Cyclical Force System (212) generates a pulsating force as the rollers on the rotating rotor cyclically engage with the elastomeric tubing, moving liquid nutrients and indicating tubing clogs. The system operates on the principle of converting rotational motion into a pulsating force, which is essential for the propulsion of liquid nutrients through the elastomeric tubing. As the rotor (210) turns, the rollers periodically compress and release the tubing, creating a peristaltic action that moves the fluid.

The pulsating force serves to ensure a consistent and controlled flow of nutrients and to detect obstructions. When the tubing experiences increased tension due to a clog, the force exerted by the rollers' changes. This variation in force is detected by the force sensitive resistor (206), which alters its electrical resistance in response to mechanical stress. The system operates continuously during the pump's active cycles, with the force sensitive resistor providing data on the tubing's tension. This data is relayed to a microcomputer (208), which analyzes the resistance patterns. If the resistance drops below a certain threshold, indicative of a clog, the microcomputer triggers an alert to notify healthcare providers. The interaction between the rotor, rollers, and force sensitive resistor ensures the pump's reliability and safety, alerting caregivers to potential issues promptly and allowing for immediate intervention to maintain the efficacy of enteral feeding and patient care.

REFERENCES

1. Pöll Johan S. The story of the gauge. *Anaesthesia.* 1999; 54.
2. WolframAlpha. French Unit Conversions. https://www.wolframalpha.com/input/?i=1+french.
3. IUPAC. International Union of Pure and Applied Chemistry GoldBook. https://goldbook.iupac.org/.
4. Merriam-Webster's Online Dictionary. https://www.merriam-webster.com/.
5. Porter R. S., & Kaplan, J. L. (Eds.). *The Merck manual of diagnosis and therapy* (19th ed.). Merck Sharp & Dohme Corp . . . 2011, (978-0-911910-19-3).
6. Robert S. Porter et al., (eds.). *The Encyclopedia of Molecular Cell Biology and Molecular Medicine*. Blackwell Science Ltd.; 1999-2012, (9783527600908).
7. Robert A. Meyers (ed.). *Molecular Biology and Biotechnology: A Comprehensive Desk Reference*. VCH Publishers, Inc.; 1995, (1-56081-569-8).
8. Luttmann Werner. *Immunology*. Elsevier; 2006,
9. Kenneth Murphy Allan Mowat, Casey Weaver (eds.). *Janeway's Immunobiology*. Taylor & Francis Limited; 2014, (9780815345305).
10. Krebs Jocelyn E., et al. *Lewin's genes XI.* 11th ed. Burlington, Mass.: Jones & Bartlett Learning; 2014, (1449659055).
11. Green Michael R. *Molecular cloning: a laboratory manual/Michael R. Green, Joseph Sambrook.* Cold Spring Harbor, N.Y: Cold Spring Harbor Laboratory Press; 2012, (1936113414).
12. Davis et al. *Basic Methods in Molecular Biology*. Elsevier Science Publishing, Inc.; 2012, (044460149X).
13. Jon Lorsch (ed.). *Laboratory Methods in Enzymology: DNA*. Elsevier; 2013, (0124199542).
14. Frederick M. Ausubel (ed.). *Current Protocols in Molecular Biology* (*CPMB*). John Wiley and Sons 2014, (9780471503385).
15. John E. Coligan (ed.). *Current Protocols in Protein Science* (*CPPS*). John Wiley and Sons, Inc.; 2005,
16. John E. Coligan A D A M Kruisbeek, David H Margulies, Ethan M Shevach, Warren Strobe, (eds.) *Current Protocols in Immunology* (*CPI*). John Wiley and Sons, Inc.; 2003, (9780471142737).

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The foregoing written specification and figures are considered to be sufficient to enable one skilled in the art to practice the present aspects and embodiments. The present aspects and embodiments are not to be limited in scope by examples provided, since the examples are intended as a single illustration of one aspect and other functionally equivalent embodiments are within the scope of the disclosure. Various modifications in addition to those shown and described herein will become apparent to those skilled in the art from the foregoing description and fall within the scope of the appended claims. The advantages and objects described herein are not necessarily encompassed by each embodiment. Those skilled in the art will recognize or be able to ascertain using no more than routine experimentation, many equivalents to the specific embodiments described herein. Such equivalents are intended to be encompassed by the following exemplary claims.

I claim:

1. A system for detecting a normal fluid flow through an enteral feeding pump and for detecting an abnormal fluid flow or a lack of flow through the enteral feeding pump, the system comprising:

a motor mounted to a pivotable motor mounting plate, the motor including a motor shaft that extends through an external housing having an external housing plate, wherein the motor, the motor shaft and the pivotable motor mounting plate pivot along a pivot axis in response to a force applied to a central hub supporting a rotor outside of the external housing plate from a peristaltic pumping of an elastomeric tubing section wrapped on the rotor;

wherein the pivotable motor mounting plate is freely pivotable along the pivot axis, and the pivotable motor mounting plate is operative to compress a force sensor, operative to detect a normal flow or an abnormal flow, positioned between an internal side of the external housing plate and the pivotable motor mounting plate in response to the force applied to the central hub from the peristaltic pumping;

wherein the rotor functions to accept the elastomeric tubing section, and rollers on the rotor function to pump a fluid through the elastomeric tubing section when the motor turns the motor shaft in the peristaltic pumping of the elastomeric tubing section; and wherein when the elastomeric tubing section is installed on the rotor, and the motor shaft is turning, and a normal fluid flow is established through the enteral feeding pump, a pressure on the force sensor is in a normal peristaltic state; and wherein the pivot axis that extends along the motor shaft is disposed at an acute angle in relation to a plane defined by the external housing when there is not an elastomeric tubing section on the roller; and wherein when a clog or a malfunction occurs in the elastomeric tubing section, an altered pressure on the force sensor is operative to indicate an abnormal or a clogged state in the elastomeric tubing section.

2. The system of claim 1, wherein the force sensor comprises a force sensitive resistor.

3. The system of claim 1, wherein the system includes a gap between the pivotable motor mounting plate and the internal side of the external housing plate when there is not an elastomeric tubing section on the roller.

4. The system of claim 1, wherein the motor shaft is disposed about orthogonal to the external housing plate when there is an elastomeric tubing section on the roller.

5. The system of claim 1, wherein when an elastomeric tubing section is affixed around the rotor, an elastomeric tension on the elastomeric tubing section is operative to cause a tilt in the pivotable motor mounting plate, and the tilt causes a pressure between the pivotable motor mounting plate and the internal side of the external housing plate; said pressure causing a change in a state of the force sensor.

6. The system of claim 1, further comprising one or more electrical connections between the force sensor and a processor; said processor operative to indicate an alarm state when the force sensor detects an abnormal flow or a lack of flow.

7. The system of claim 1, further comprising one or more electrical connections between the force sensor and a processor, and a wireless transmission device operative to transmit an alarm signal when the force sensor detects an abnormal flow or a lack of flow.

8. The system of claim 1, wherein the force sensor is operative to perform a shut off of the motor when the force sensor detects an abnormal flow or a lack of flow.

9. The system of claim 1, wherein the pivotable motor mounting plate includes one or more springs or spring mechanisms operative to push the pivotable motor mounting plate against the internal side of the external housing plate so that the pivotable motor mounting plate is not parallel to the external housing plate when no elastomeric tubing section is on the rotor.

10. The system of claim 1, further comprising a computer with software and memory operative to store a normal electrical output for the force sensor and 1) to detect an abnormal electrical output from the force sensor and 2) to transmit an alarm to a healthcare provider when the abnormal electrical output is detected.

11. A kit for upgrading an enteral feeding pump so that the enteral feeding pump can detect a normal fluid flow through the enteral feeding pump and can detect an abnormal fluid flow or a lack of flow through the enteral feeding pump after the upgrade, the kit comprising:

A) a pivotable motor mounting plate operative to mount a motor upon the pivotable motor mounting plate, the motor including a motor shaft that extends through an external housing having an external housing plate, wherein the motor, the motor shaft and the pivotable motor mounting plate are freely pivotable along a pivot axis in response to a force applied to a central hub supporting a rotor outside of the external housing plate from a peristaltic pumping of an elastomeric tubing section wrapped on the rotor;

a force sensor, operative to detect a normal flow or an abnormal flow, positioned between an internal surface of the external housing plate and the pivotable motor mounting plate, wherein the pivotable motor mounting plate is freely pivotable along the pivot axis, and the pivotable motor mounting plate is operative to compress the force sensor, in response to the force applied to the central hub from the peristaltic pumping;

wherein the rotor functions to accept the elastomeric tubing section, and rollers on the rotor function to pump a fluid through the elastomeric tubing section when the motor turns the motor shaft in the peristaltic pumping of the elastomeric tubing section;

wherein when the elastomeric tubing section is installed on the rotor, and the motor shaft is turning, and a normal fluid flow is established through the pump, a pressure on the force sensor is in a normal peristaltic state; and wherein the pivot axis that extends along the motor shaft is disposed at an acute angle in relation to a plane defined by the external housing when there is not an elastomeric tubing section on the roller; and wherein when a clog or a malfunction occurs in the elastomeric tubing section, an altered pressure on the force sensor is operative to indicate an abnormal or a clogged state in the elastomeric tubing section; and B) instructions for installing one or more parts in A) above and instructions for use.

12. The kit of claim 11, wherein the force sensor comprises a force sensitive resistor, and wherein the kit is configured to send an alarm warning via WiFi indicating an abnormal or a clogged state.

* * * * *